(12) United States Patent
English

(10) Patent No.: US 11,613,430 B2
(45) Date of Patent: Mar. 28, 2023

(54) RACK LIFTER SYSTEM AND METHOD

(71) Applicant: English Logistics Inc., Alliston (CA)

(72) Inventor: James David English, Egbert (CA)

(73) Assignee: English Logistics Inc., Alliston (CA)

( * ) Notice: Subject to any disclaimer, the term of this patent is extended or adjusted under 35 U.S.C. 154(b) by 68 days.

(21) Appl. No.: 17/000,482

(22) Filed: Aug. 24, 2020

(65) Prior Publication Data

US 2021/0053772 A1    Feb. 25, 2021

Related U.S. Application Data

(60) Provisional application No. 62/890,791, filed on Aug. 23, 2019.

(51) Int. Cl.
*B60P 1/02* (2006.01)
*B65G 47/90* (2006.01)

(52) U.S. Cl.
CPC ............... *B65G 47/90* (2013.01); *B60P 1/02* (2013.01)

(58) Field of Classification Search
USPC ............... 211/85.8; 414/458, 608, 410–412
See application file for complete search history.

(56) References Cited

U.S. PATENT DOCUMENTS

| | | | |
|---|---|---|---|
| 3,327,996 A * | 6/1967 | Morse | B66F 3/36 414/458 |
| 4,491,452 A * | 1/1985 | Matovich | B60B 29/002 414/427 |
| 4,884,936 A * | 12/1989 | Kawada | B62B 3/04 280/43.12 |
| 5,411,360 A * | 5/1995 | Hilliker | B65G 49/062 108/53.5 |
| 5,716,186 A * | 2/1998 | Jensen | B60B 33/0063 187/244 |
| 6,536,607 B1 | 3/2003 | Knoll et al. | |
| 6,820,752 B2 | 11/2004 | Jeskey et al. | |
| 6,910,591 B2 | 6/2005 | Knoll et al. | |
| 7,311,487 B1 * | 12/2007 | Crossley | B65G 7/02 414/458 |
| 7,438,301 B2 * | 10/2008 | Schilling | B62B 5/0086 280/47.23 |
| 7,862,285 B1 * | 1/2011 | Dove | B66F 3/08 414/458 |
| 8,317,451 B2 * | 11/2012 | Cozza | B66F 15/00 414/490 |

(Continued)

*Primary Examiner* — Ronald P Jarrett

(74) *Attorney, Agent, or Firm* — Own Innovation; James W. Hinton

(57) ABSTRACT

A rack and lifter system and method is described. The system includes a rack having at least a first engagement opening, and a lifter having at least a first engagement member and at least a first vertical extension member, wherein in use the at least a first engagement member interlocks with the at least a first engagement opening of the rack, and the at least a first vertical extension member extends to lift the interlocked lifter and rack, wherein the at least a first vertical extension member includes means for movement. The lifter may include a guiding-and-lifting member which lifts the lifter and guides the lifter into an interior space of the rack. The lifter may include a towing machine connection member which connects the lifter to a towing machine which positions the lifter within the rack and tows the connected lifter and rack.

21 Claims, 26 Drawing Sheets

(56) References Cited

U.S. PATENT DOCUMENTS

| | | | |
|---|---|---|---|
| 8,794,899 B2* | 8/2014 | Cozza | B65G 7/04 |
| | | | 414/458 |
| 10,059,574 B2* | 8/2018 | Walsh | B66F 3/46 |
| 2001/0008344 A1* | 7/2001 | Lanciaux, Jr. | B65D 90/146 |
| | | | 414/458 |
| 2006/0182567 A1* | 8/2006 | Roestel | B65G 49/062 |
| | | | 414/458 |
| 2008/0056867 A1* | 3/2008 | Zuckerman | B66F 9/141 |
| | | | 414/458 |
| 2010/0226740 A1* | 9/2010 | Humble | B60P 1/6409 |
| | | | 74/484 R |

* cited by examiner

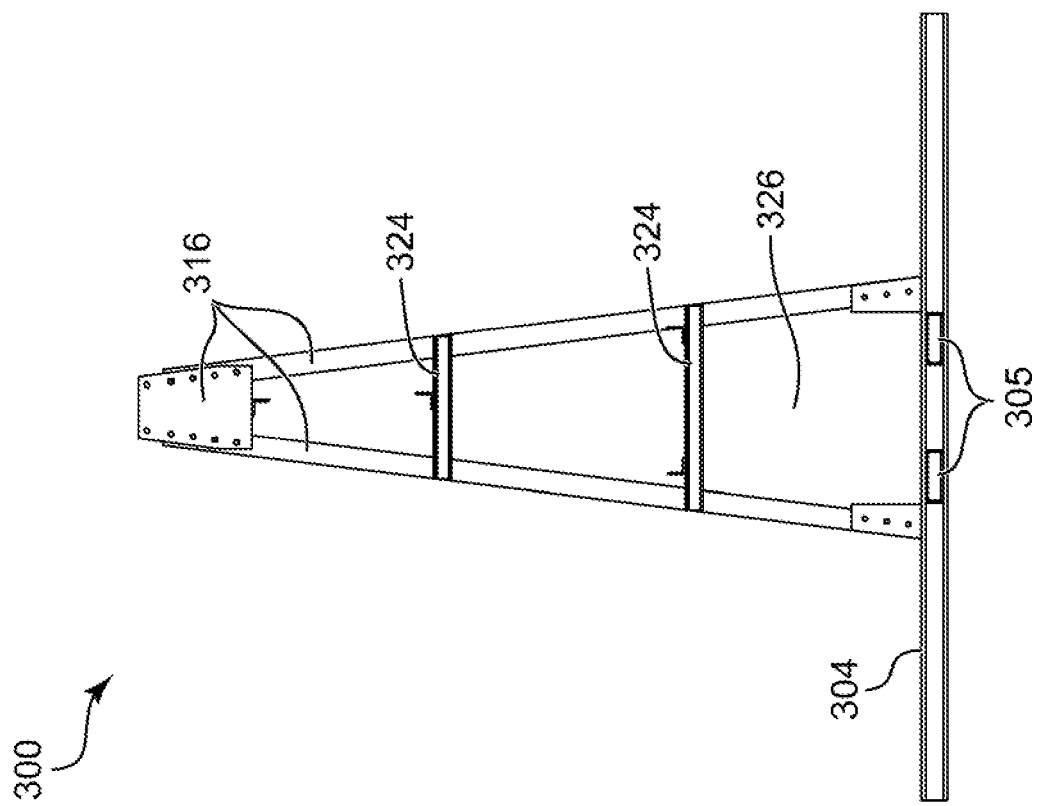

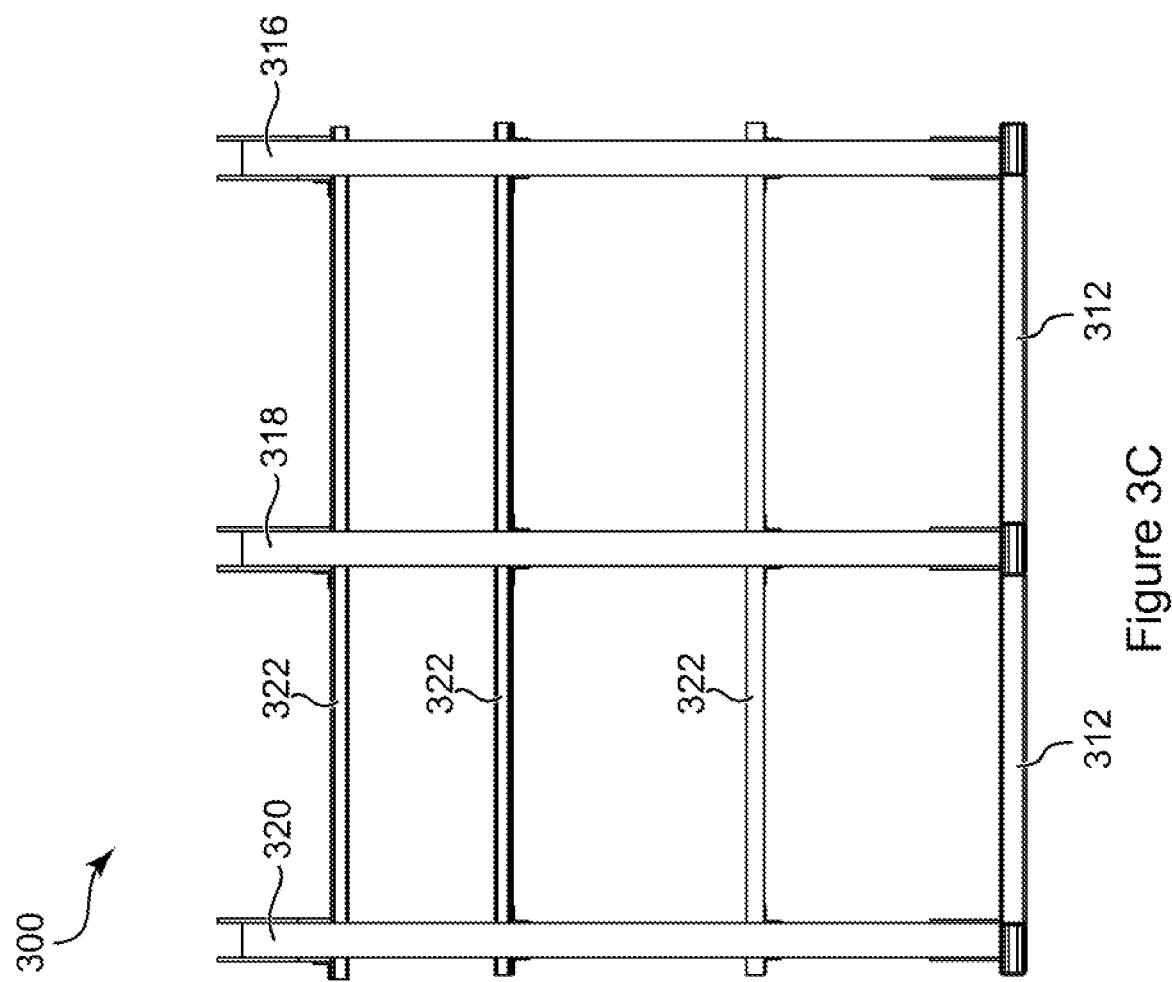

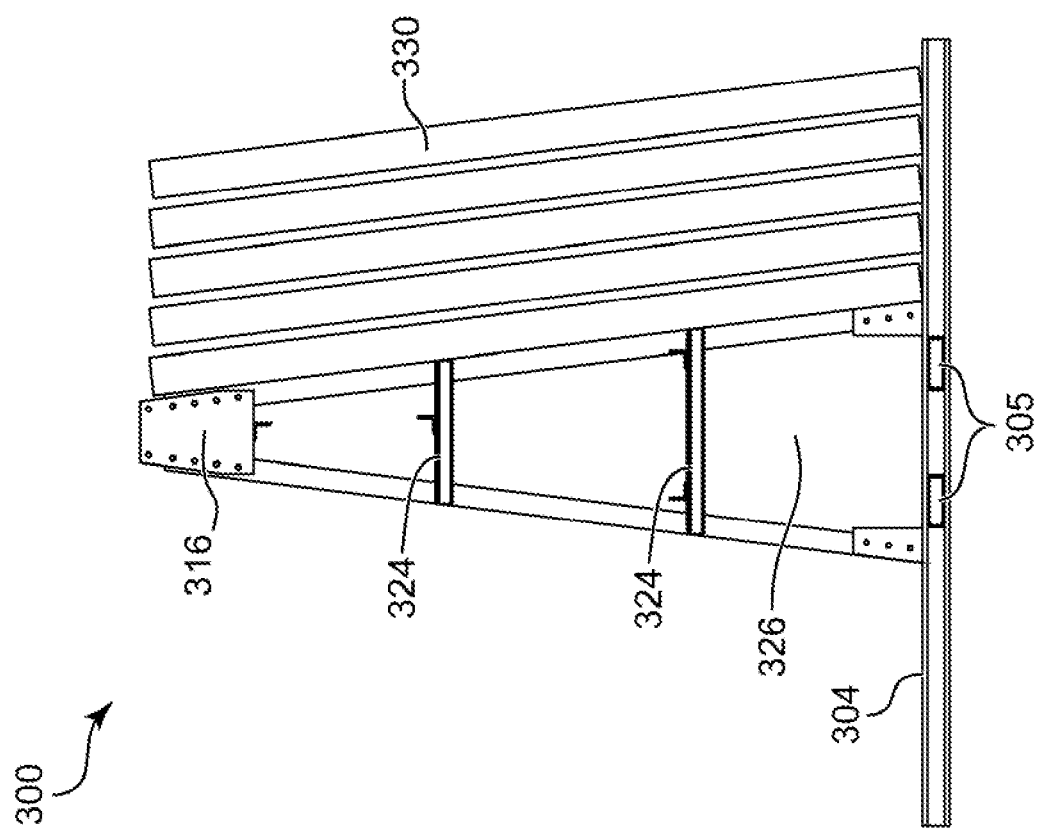

RACK LIFTER SYSTEM AND METHOD

TECHNICAL FIELD

The embodiments disclosed herein relate to lifting systems, and, in particular, to a lifter system for glass racks.

INTRODUCTION

In the glass hauling industry, the loading and transport of panes of glass requires specialized equipment to minimize the risks of damage. Current glass transportation methods are expensive and inefficient. For example, glass racks are most often loaded onto trailers or shipping containers using an overhead crane which is dangerous, both for the glass and for the workers, time consuming, and expensive. Other current systems try to combine the functions of lifting racks and moving racks into a single machine which may not be cost-effective or functional for more than one step of production or transportation. Current methods are limited in the different sizes of glass which a single method can accommodate. These methods also have limitations on the weight and therefore amount of glass that can be moved at one time.

Accordingly, there is a need for a rack lifting system which facilitates greater efficiency in loading and transport of glass racks.

SUMMARY

The present application discloses embodiments that relate to lifting systems for racks.

In accordance with one aspect, the present application describes a rack transportation system including a rack for holding a material, the rack having at least a first lifter engagement opening; a lifter for lifting the rack, the lifter comprising: at least a first engagement member, wherein in use the at least a first engagement member interlock with the at least a first engagement opening of the rack, and at least a first vertical extension member, wherein in use the at least a first vertical extension member extend to lift the interlocked lifter and rack, and wherein the at least a first vertical extension member includes at least a first movement member.

In another aspect of the system, the lifter further comprises a connection member which in use connects the lifter to a towing machine.

In another aspect of the system, the towing machine is a forklift.

In another aspect of the system, the at least a first movement member of the first vertical extension member comprises at least one swivel wheel.

In another aspect of the system, the at least a first movement member of a second vertical extension member comprises at least one fixed wheel.

In another aspect of the system, the lifter further includes a guiding-and-lifting member, wherein in use the guiding-and-lifting member guides the movement of the lifter and lifts the lifter.

In another aspect of the system, the guiding-and-lifting member comprises at least one fixed wheel.

In another aspect of the system, the system further includes a lifter controller which in use controls the extension of the at least one vertical extension member.

In another aspect of the system, the at least one vertical extension member comprises hydraulic cylinders for extension.

In another aspect of the system, the system further includes a hydraulic controls reservoir and directional and fluid control valves in order to control the operation of the hydraulics elements of the system.

In another aspect of the system, the lifter further includes a stabilizing member for balance.

In another aspect of the system, the stabilizing member for balance comprises one or more of a swivel carriage lifter or a stabilizer lifter.

In another aspect, the present application describes a rack lifter including a frame; a connection member connected to the frame; at least a first engagement member connected to the frame; and at least a first vertical extension member connected to the frame, wherein in use the at least a first engagement member interlocks with at least a first engagement opening of a rack, and the at least a first vertical extension member extends to lift the lifter and rack, wherein the at least a first vertical extension member includes at least a first movement member.

In another aspect of the lifter, the at least a first movement member of the first vertical extension member comprises at least one swivel wheel.

In another aspect of the lifter, the at least a first movement member of a second vertical extension member comprises at least one fixed wheel.

In another aspect of the lifter, the lifter further includes a guiding-and-lifting member, wherein in use the guiding-and-lifting member guides the movement of the lift and lifts the lifter.

In another aspect of the lifter, the lifter further includes a lift controller which in use controls the extension of the at least one vertical extension member.

In another aspect of the lifter, the at least one vertical extension member comprises hydraulic cylinders for extension.

In another aspect of the lifter, the lifter further comprises a stabilizing member for balance, wherein the stabilizing member is connected to the frame.

In another aspect of the system, the system further comprises a wireless human-machine interface and associated storage for same.

In another aspect, the present application describes a method of lifting a rack using a lifter, wherein the rack includes an interior space and at least one engagement opening, and the lifter includes a towing machine connection member, a guiding-and-lifting member, at least one engagement member with at least one engagement foot, and at least one vertical extension member. The method includes connecting the lifter to a towing machine by the towing machine connection member of the lifter; raising the lifter off the ground by the guiding-and-lifting member of the lifter; maneuvering the lifter into the interior space of the rack by moving the connected lifter and towing machine; lowering the lifter within the interior space of the rack by lowering the guiding-and-lifting member of the lifter; maneuvering the lifter by moving the connected lifter and towing machine such that the at least one engagement foot of the at least one engagement member interlock with the at least one engagement opening of the rack; and extending the at least one vertical extension member to lift the rack by the lifter.

In another aspect of the method, the method further includes moving the lifter and the rack by moving the towing machine.

In another aspect of the method, the method further includes lowering the rack to the ground by shortening the vertical extension members; removing the at least one engagement foot from the at least one engagement opening by moving the connected lifter and towing machine; lifting the lifter by raising the guiding-and-lifting member; removing the lifter from the interior space of the rack by moving the connected lifter and towing machine; lowering the lifter by lowering the guiding-and-lifting member, wherein the lifter is supported by the at least one vertical extension member; and disconnecting the lifter from the lifting-and-towing machine by disengaging the lifting-and-towing machine connection member.

In another aspect, the present application describes a system and a method as described herein.

Other aspects and features will become apparent, to those ordinarily skilled in the art, upon review of the following description of some exemplary embodiments.

BRIEF DESCRIPTION OF THE DRAWINGS

The drawings included herewith are for illustrating various examples of articles, methods, and apparatuses of the present specification. In the drawings:

FIGS. 3A to 3G are perspective, end, side, and top views, respectively of a rack, in accordance with an embodiment.

DETAILED DESCRIPTION

Various apparatuses or processes will be described below to provide an example of each claimed embodiment. No embodiment described below limits any claimed embodiment and any claimed embodiment may cover processes or apparatuses that differ from those described below. The claimed embodiments are not limited to apparatuses or processes having all of the features of any one apparatus or process described below or to features common to multiple or all of the apparatuses described below.

Figure 1:
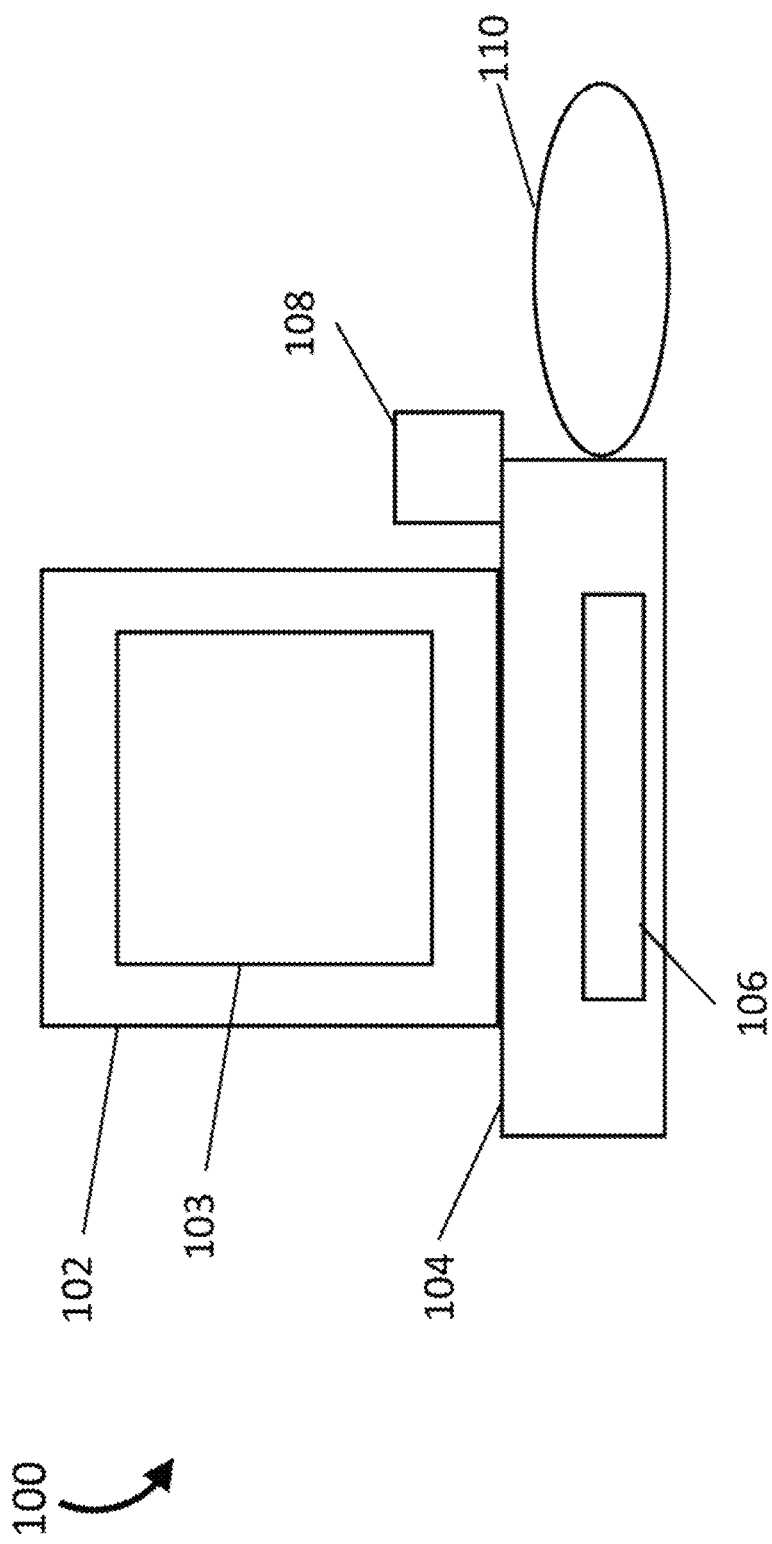
FIG. 1 is a block diagram of a rack lifting system, according to an embodiment.

Referring to FIG. 1, illustrated therein is a block diagram of a rack transportation system 100, according to an embodiment. The lifting and transportation system 100 includes a rack 102 for holding one or more pieces of a material 103, such as glass. The rack transportation system 100 includes a lifter 104 for engaging and lifting the rack 102. The rack transportation system 100 includes a lifting and towing machine 110, such as a forklift, for moving the lifter 104 and rack 102.

The lifter 104 includes at least a first set of engagement members having engagement feet which engage with engagement openings of rack 102, at least a first set of vertical extension members which raise and lower lifter 104, The lifter 104 includes a lifting-and-towing machine connector. The lifter 104 includes a hydraulic system 106 integrated with lifter 104 which enables raising and lowering of the lifter by extending or shortening the vertical extension members. The lifter 104 includes a controller 108 which enables a user to control the hydraulic system and therefore the height of the lifter.

The system 100 includes a lifting-and-towing machine 110 which lifts and maneuvers lifter 104 into a position to engage with rack 102 and, once lifter 104 and rack 102 are engaged, transports engaged lifter 104 and rack 102 to a desired location.

In this embodiment, rack 102 is a glass rack which carries glass panes. Glass panes may be heavy and fragile and need a specialized rack to minimize the risk of damage to the glass. In other embodiments, the rack may have a different structure or may carry different materials, such as marble slabs, metal sheets, etc.

Rack 102 has at least a first set of engagement openings which in use interlock with the engagement feet of lifter 104. In this embodiment the engagement openings are on the base of rack 102.

Lifter 104 includes a hydraulic system 106. In this embodiment, hydraulic system 106 is carried, at least in part, within the structure of lifter 104. Hydraulic pistons are carried within the vertical extension members of lifter 104. Controller 108 controls the action of the hydraulic system and enables lifter 104 to be raised and lowered by the hydraulic pistons carried within the vertical extension members of lifter 104. The raising and lowering of lifter 104 is accomplished by extending or shortening the vertical extension members. When lifter 104 is raised or lowered the vertical extension members are always in contact with the ground while the rest of lifter 104 is moved further from the ground or closer to the ground. When lifter 104 is interlocked with rack 102 by interlocking the engagement feet of the engagement members of lifter 104 with the engagement openings of rack 102, raising and lowering lifter 104 by the hydraulic system will also raise and lower rack 102.

Lifting system 100 includes a lifting-and-towing machine 110 which in use is connected to lifter 104 by a connection member on lifter 104 and a connection member on lifting-and-towing machine 110. The connection between lifter 104 and lifting-and-towing machine 110 may be a ball and hitch connection. Lifting-and-towing machine 110 may be a forklift or may be any other type of machine which can connect to lifter 104, raise and lower lifter 104, and maneuver lifter 104.

Lifting system 100 works as follows. Lifter 104 is connected to lifting-and-towing machine 110 by the connection members of lifter 104 and towing machine 110. Lifter 104 is lifted off the ground by lifting-and-towing machine 110 such that no part of lifter 104 is in contact with the ground. Lifter 104 is maneuvered into a position to engage with rack 102. That is, lifter 104 is towed and pushed into an interior space of rack 102. Lifter 104 is lowered by lifting-and-towing machine 110 such that lifter 104 is touching the ground. Lifter 102 engages with rack 104. That is, lifter 104 is pushed or towed by lifting-and-towing machine 110 into a position where the engagement feet of lifter 104 are interlocked with the engagement opening of rack 102. Lifter 104 lifts rack 102 by extending the vertical extension members such that the weight of rack 104 is supported by lifter 102 and not by lifting-and-towing machine 110. The vertical extension members are extended by hydraulic system 106 which is controlled by controller 108. Lifting-and-towing machine 110 moves the connected lifter 104 and rack 102.

Herein, above and below, embodiments which employ a forklift to connect to, lift, lower, tow, and push a lifter are described. However, a person of skill in the art will appreciate that any equipment which is capable of connecting to other equipment, lifting, lowering, towing, and pushing may be used instead of a forklift.

Figure 2:
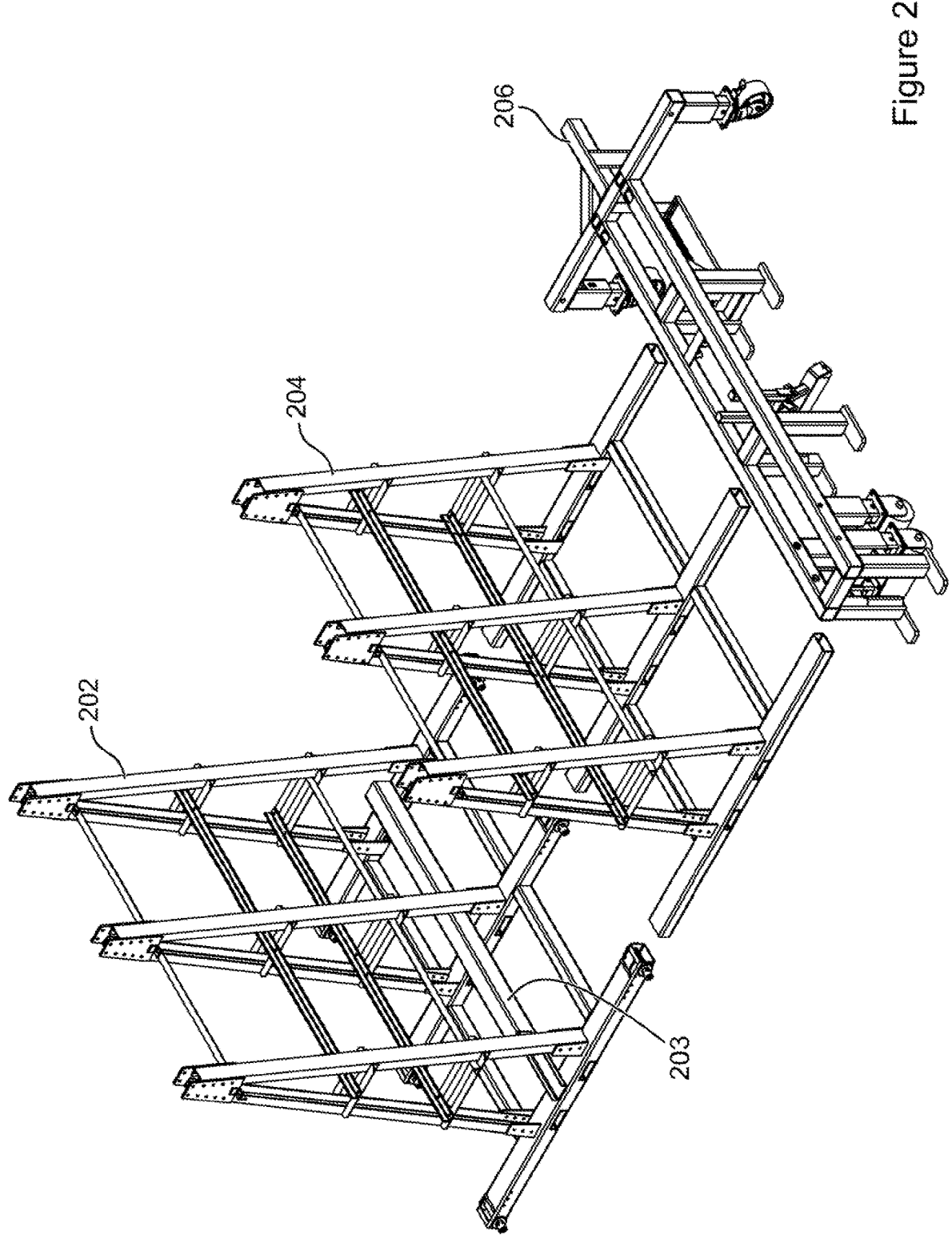
FIG. 2 is a view of two racks and a lifter which can be employed in a glass rack lifting system, in accordance with an embodiment.

FIG. 2 is a view of two racks 202 and 204 and a lifter 206 which may be employed in a glass rack lifting system. Rack 202 is also shown in FIGS. 3A, 3B, 3C, and 3D and discussed further below. Lifter 206 is also shown in FIGS. 4A, 4B, and 4C and discussed further below. FIG. 2 shows the racks and lifter drawn to scale.

Rack 202 and 204 are both used for carrying glass panes, however, racks which carry other materials or that have different designs may be lifted by lifter 206 or similar lifters described herein.

Rack 202 includes a beam 203 at the base which is not a part of rack 204. This beam may provide additional stability to the rack that may be necessary in some applications. Rack 202 may be used with the lifter shown in FIGS. 5A, 5B, 5C, and 5D which has been designed to function with the presence of beam 203.

Rack 204 does not have a beam in the same place as beam 203 and may be used with lifter 206 and the lifter shown in FIGS. 4A, 4B, and 4C which has been designed to function in the absence of a beam similar to beam 203.

In other embodiments, components of a rack may be foldable to allow multiple racks to be stacked and transported together on a single lifter. These racks may have the benefit of reducing the cost of shipping empty racks, for example, when racks need to be shipped back to the original location after transporting glass to a customer.

Figure 3A:
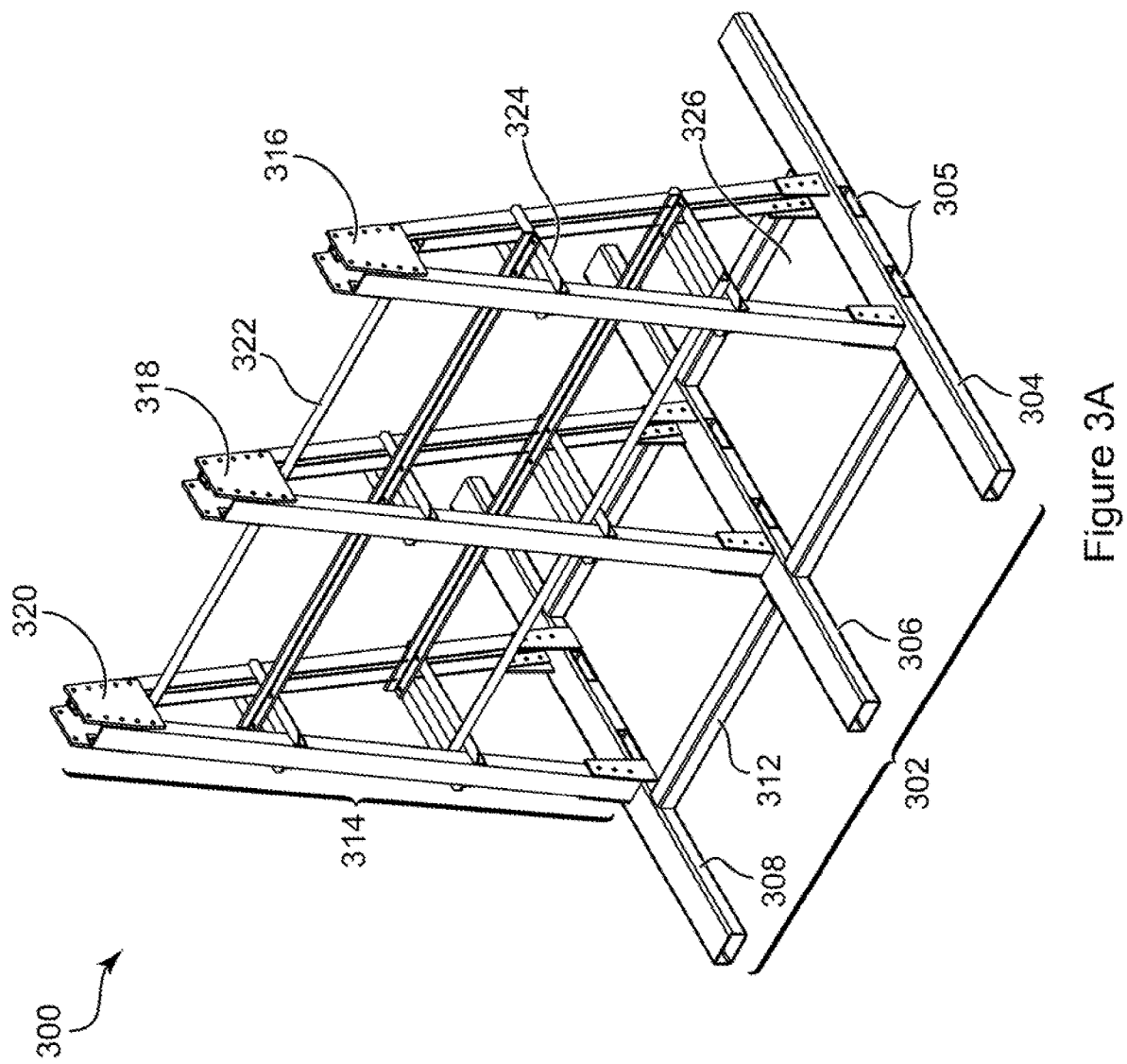
Figure 3D:
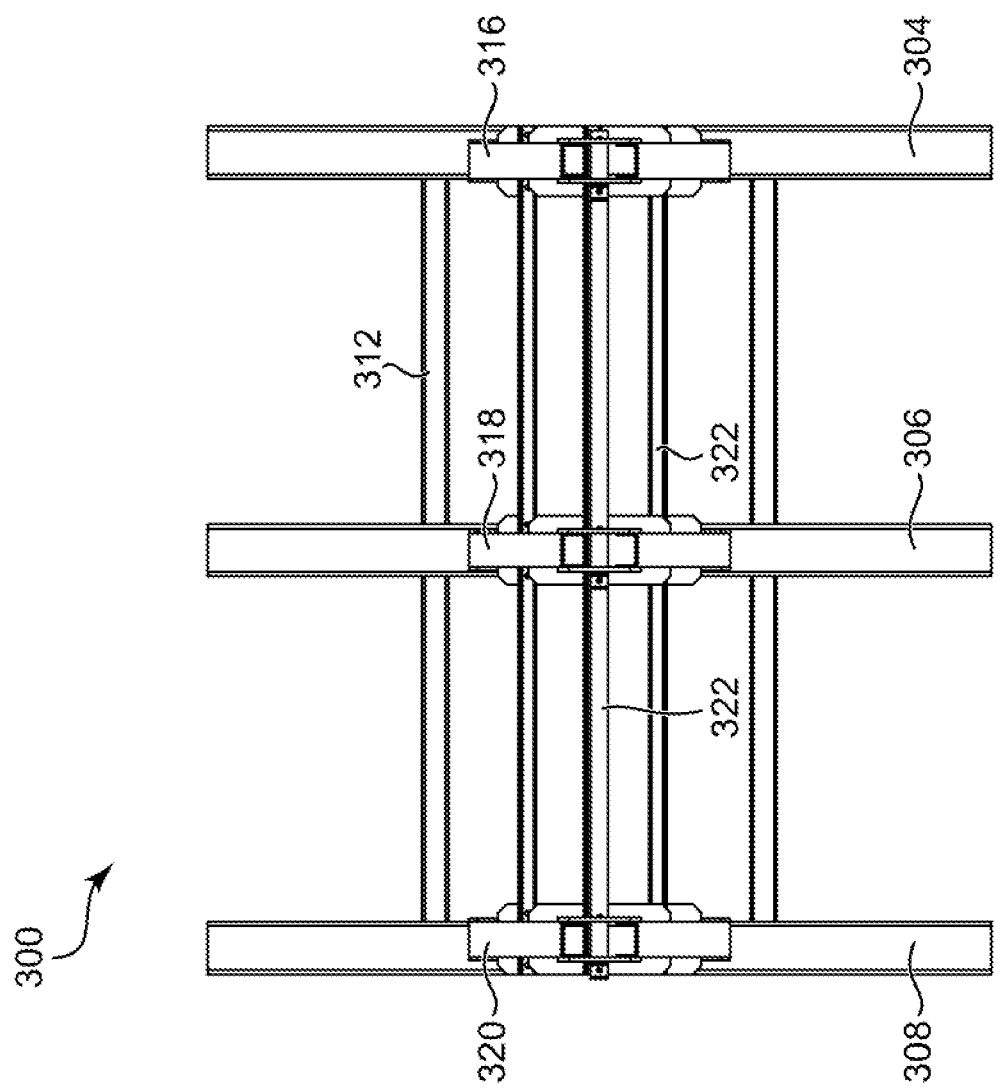
Figure 3F:
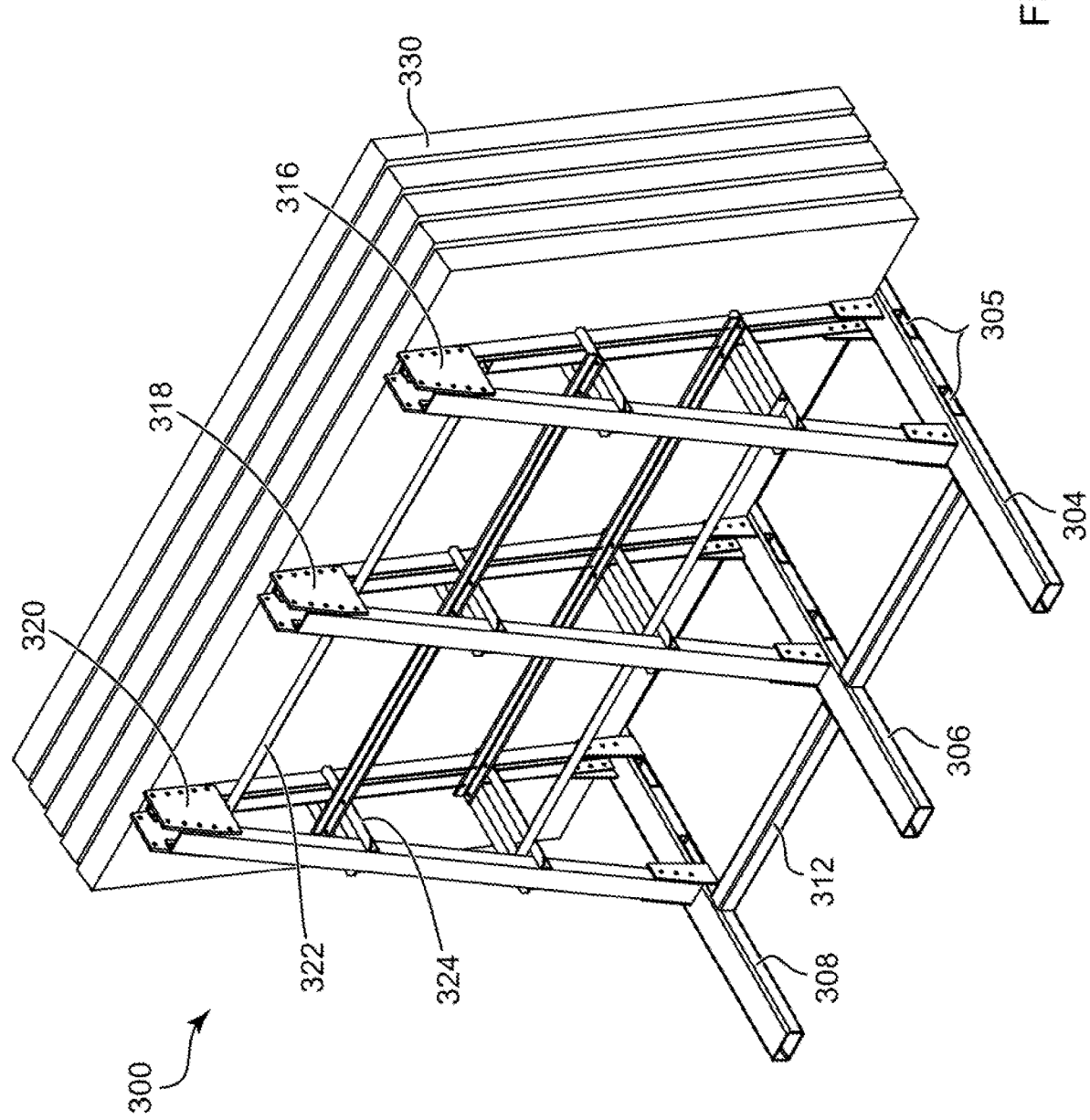
Figure 3G:
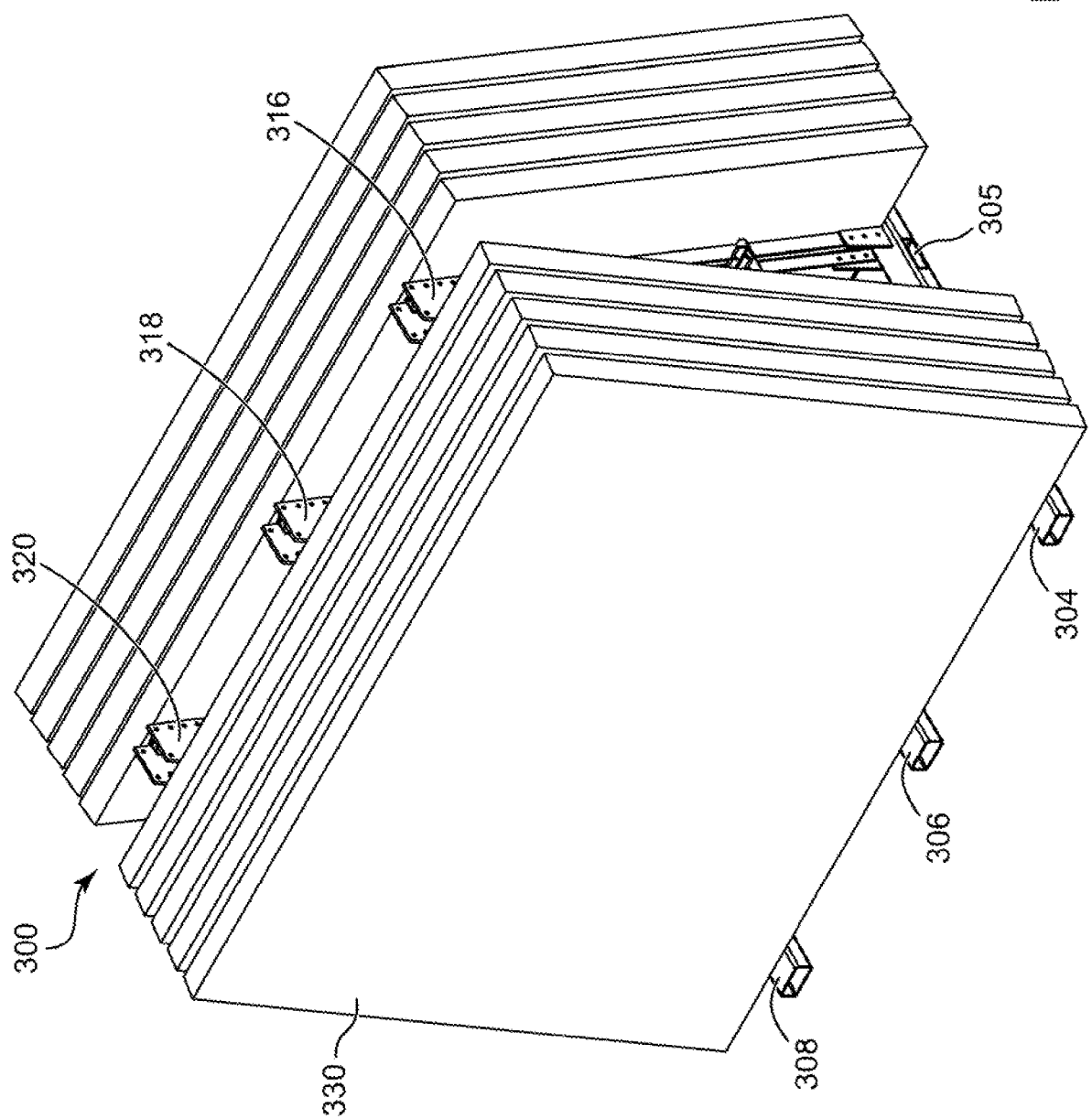
Figure 4A:
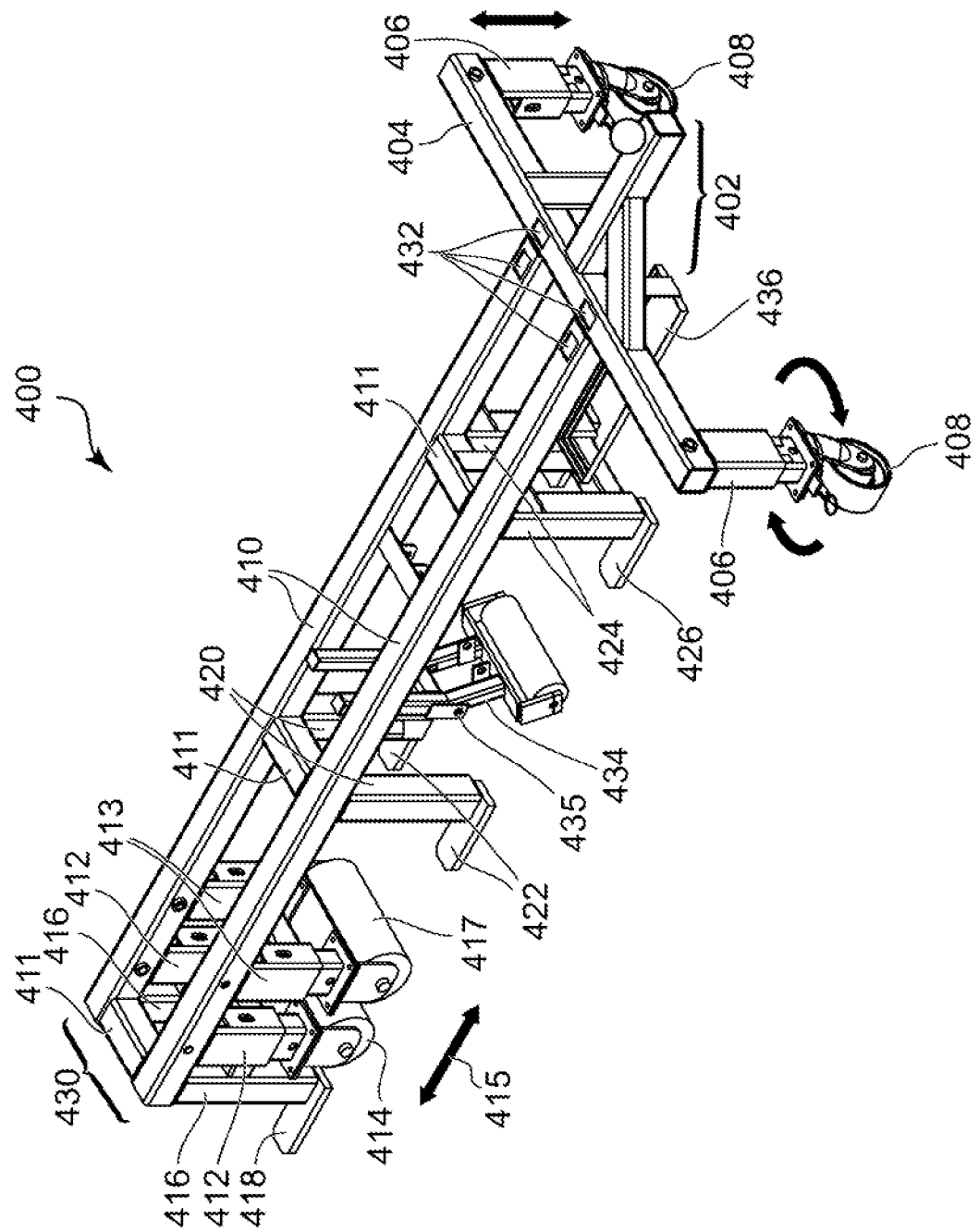
FIGS. 4A to 4C are perspective, side, and top views, respectively, of a lifter, in accordance with an embodiment.
Figure 4B:
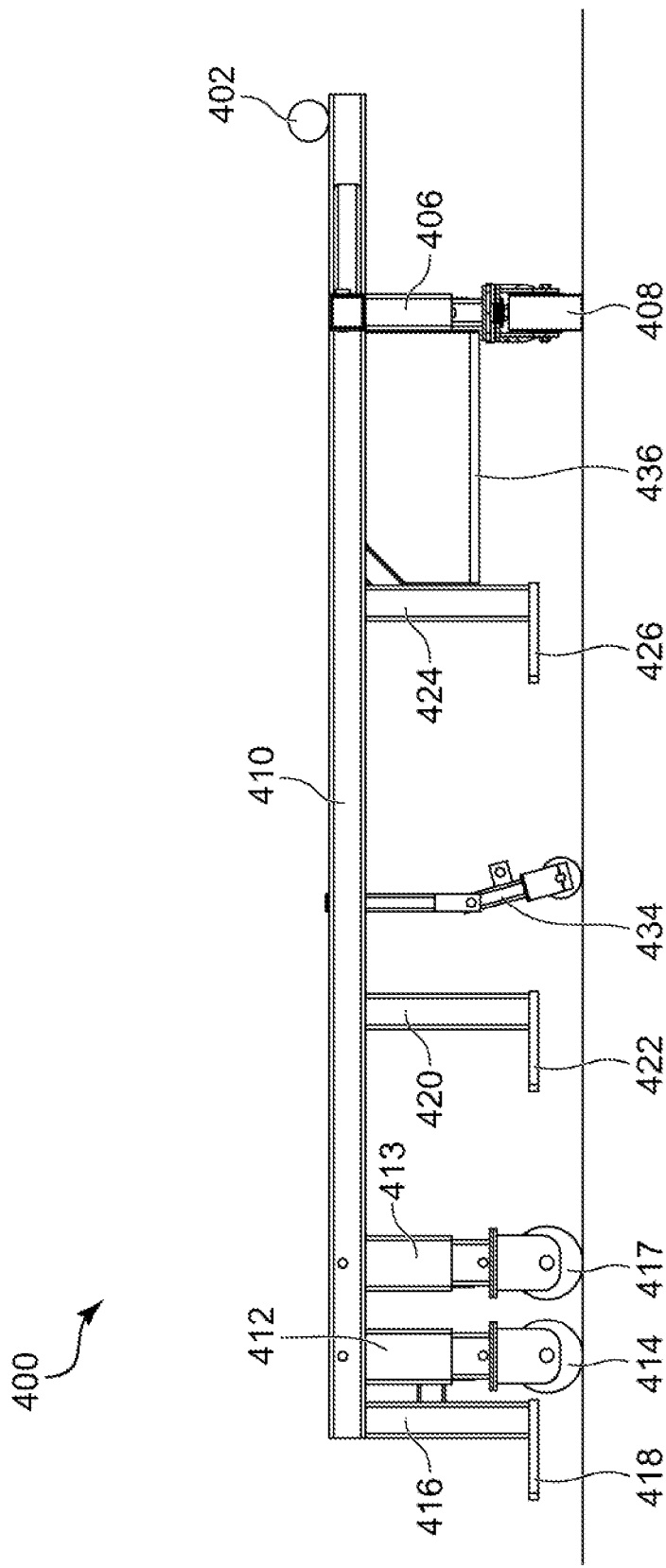
Figure 4C:
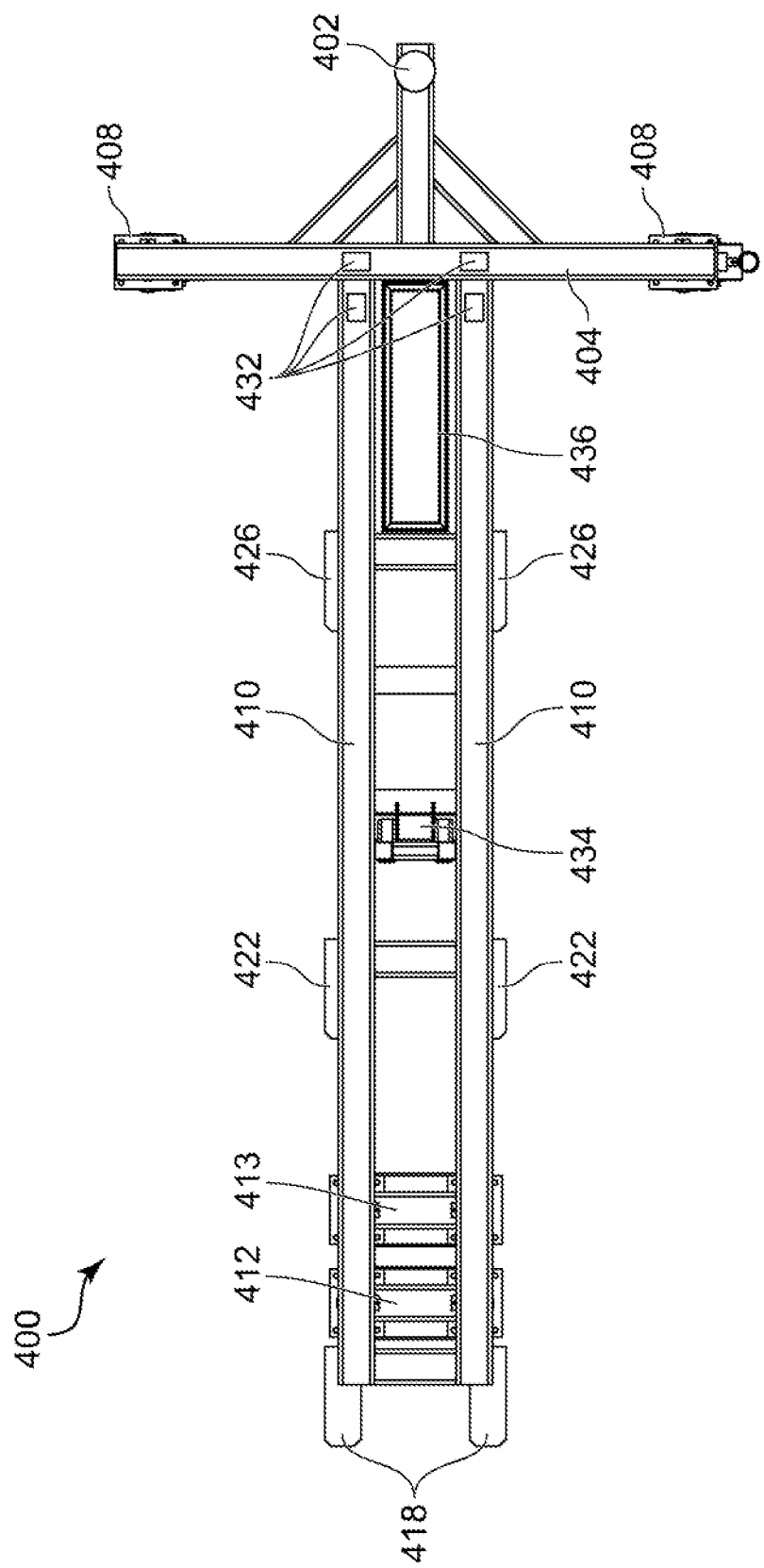

FIGS. 3A, 3B, 3C, 3D, 3E, 3F, and 3G are various views of a rack 300 of a rack lifting system, according to one embodiment. Rack 300 includes base 302 and top 314. Base 302 comprises three base beams 304, 306, and 308 with engagement openings 305 (only called out on base beam 304 to reduce clutter), and base beam connection beams 312. Top 314 comprises three A-frame members 316, 318, and 320 and A-frame connection beams 322 and support beams 324. A-frame members 316, 318, and 320 and base 302 create an interior space 326. FIGS. 3E, 3F, and 3G includes glass 330.

Base 302 comprises three base beams 304, 306, and 308 which are positioned parallel to one another. Each base beam 304 includes two engagement openings 305 into which a lifter (similar to lifter 500 of FIG. 5) may engage. Base beams 304, 306, and 308 are directly connected by four connection beams 312 which are all positioned perpendicular to base beams 304, 306, and 308 and parallel to one another.

Top 314 comprises three A-frame members 316, 318, and 320 which are positioned parallel to one another. A-frame members 316, 318, and 320 each include two beams which are directly connected at the top (ends furthest from base 302). The two beams of each A-frame members 316, 318, and 320 are directly connected to base beam 304, 306, and 308 respectively. The two beams of each A-frame member 316, 318, and 320 are spaced further apart at base 302 than at the top where they are directly connected. This makes the A-frame shape of each A-frame member 316, 318, and 320. A-frame members 316, 318, and 320 are directly connected by connection beams 322 which are positioned parallel to connection beams 312 of base 302. The two beams of each A-frame member 316, 318, and 320 are directly connected by support beams 324 which are positioned parallel to base beams 304, 306, and 308. In this embodiment there are four connection beams 322 at three levels at different vertical heights on A-frame members 316, 318, and 320 with one connection beam at each of the two higher levels and two connection beams at the lower level. There are twelve support beams at the two lowest of the levels (two support beams at each level on each A-frame member). Connection beams 322 at the two lower levels are in direct contact with and positioned on top of support beams 324.

Interior space 326 of rack 300 is a space created between base beams 304, 306, and 308, connection beams 312, A-frame members 316, 318, and 320, and the connection beams 322 and support beams 324 which are closest to base 302. Interior space 326 is the space into which a lifter is maneuvered.

In FIGS. 3E, 3F, and 3G rack 300 is carrying glass 330 (only one pane labeled to reduce clutter). In FIGS. 3E and 3F glass 330 is only carried on one side of rack 300. In FIG. 3G glass 330 is carried on both side of rack 300. Glass 330 sits on base beams 304, 306, and 308. Glass 330 also rests, either directly or indirectly, on whichever of the two beams of A-frame members 316, 318, and 320 glass 330 is closest too. Where multiple panes of glass are carried on one side of rack 300, as in FIGS. 3E, 3F, and 3G, the pane of glass closest to an A-frame member rests directly on the A-frame member while the other panes of glass rest on an adjacent pane of glass.

In this embodiment, rack 300 is a glass rack which carries glass panes. In other embodiments, the rack may have a different structure or may carry different materials, such as marble slabs, metal sheets, etc.

In other embodiments of the lifter and rack system, any rack which has a base which has engagement openings that match the engagement members of the lifter, and which can accommodate the lifter spatially, can be used.

In other embodiments, each base beam may have only one engagement opening wherein the lifter also only have on engagement foot on each engagement member. In other embodiments, the number of engagement openings on each base beam may greater than two. In other embodiments, different base beams may have different numbers of engagement openings. In other embodiments, the shape of the engagement feet may be any shape which allows for the lifter to connect with the engagement openings and support the rack.

FIGS. 4A, 4B, and 4C are various views of a lifter 400 for a rack lifting system, according to one embodiment. Lifter 400 is similar to lifter 206 in FIG. 2.

Lifter 400 includes forklift connection member 402, lifter frame member 404, vertical extension members 406, vertical extension member swivel wheels 408, two parallel lifter frame members 410, connection frame members 411, vertical extension members 412, vertical extension members 413, vertical extension member fixed wheels 414 and 417, engagement members 416 having two engagement feet 418 (one foot is obscured in drawing), engagement members 420 having two engagement feet 422 (one foot is obscured in drawing), engagement members 424 having two engagement feet 426 (one foot is obscured in drawing), guiding-and-lifting member 434 having a joint 435, and battery shelf 436. Frame members 404 and 410 include holes 432 for a hydraulic system (not shown). Vertical extension members 406, 412, and 413, engagement members 416, 420, and 424, and guiding-and-lifting member 434 are all directly or indirectly connected to and supported by lifter frame members 404, 410, and 411. The functional specifics of lifter 400 are discussed below.

Lifter frame members 410 are two parallel beams which are connected by three connection frame members 411. Connection frame members 411 are perpendicular to lifter frame members 410. Connection frame members 411 are positioned at the same locations as engagement members 416, 420, and 424 along a length of lifter frame members 410. Connection frame members 411 provide support to lifter frame members 410 and to engagement members 416, 420, and 424.

Lifter frame member 404 is a single beam which is perpendicular to and attached to lifter frame members 410, and is parallel to connection frame members 411. Lifter frame member 404 extends beyond a width 430 of lifter frame members 410. The length of lifter frame member 404 is greater than width 430 and vertical extension members 406 are located at opposite ends of lifter frame member 404. This allows for stabilization of lifter 100, as well as increased mobility and better weight distribution when lifting a rack.

Lifter frames member 404 and 410 are hollow, wherein each member has an interior space, and are rectangular prism-shaped beams wherein the flat surfaces of the beam are parallel and perpendicular to the plane of the ground (if the ground were perfectly level and flat). Lifter frame members 404 and 410 carry the hydraulic systems within the interior spaces. Lifter frame members 404 and 410 are connected to vertical extension members 406 and 412 such that the hydraulic system runs from the interior spaces of lifter frame members 404 and 410 into an interior of vertical extension members 406 and 412, and guiding-and-lifting member 434. Holes 432 in lifter frame members 404 and 410 are entry and exit points through which the hydraulic system is embedded within lifter 400.

Battery shelf 436 holds batteries (not shown) which are connected to and provide power to the hydraulic system of lifter 400. Other embodiments may not have a battery shelf and batteries may be housed elsewhere on the lifter or on a forklift or other lifting-and-towing machine.

Guiding-and-lifting member 434 is an appendage of lifter 400 which can be raised and lowered under the power of a controller (not shown) by bending the guiding-and-lifting member at joint 435 and can lift lifter 400 up and down by activating the hydraulic system within guiding-and-lifting member 434. Guiding-and-lifting member 434 include an upper portion above the joint (closer to frame members 410) and a lower portion below the joint (further from frame members 410 than the upper portion). Guiding-and-lifting member 434 lifts lifter 400 such that only wheels 408 and guiding-and-lifting member 434 are in contact with the ground. This allows for the portion of lifter 400 in front of guiding-and-lifting member 434 (the portion between guiding-and-lifting member 434 and engagement member 416) to be moved into an interior space of the rack.

The lower portion of guiding-and-lifting member 434 includes a fixed wheel similar to fixed wheels 414 and 417. This fixed wheel provides guidance and stability to lifter 400 when lifter 400 is being maneuvered to interlock with the rack. When guiding-and-lifting member 434 is in a lowered position the upper portion and lower portion are aligned and are perpendicular to frame members 410. When guiding-and-lifting member 434 is in a raised position the upper portion remains perpendicular to frame members 410 while the lower portion is raised off of the ground and makes an angle with frame members 410 which is less than 90°. In this embodiment, the lower portion is raised off of the ground such that the fixed wheel moves closer to frame member 404 than when in the lowered position, however, in other embodiments in the raised position the fixed wheel may move further away from frame member 404.

In FIGS. 4A, 4B, and 4C, vertical extension members 406 are located at opposite ends of lifter frame member 404. Vertical extension member swivel wheels 408 have swivel casters which allow the wheels to swivel 360° and allow lifter 400 to move in any direction. This freedom of movement is represented by arrows 409.

In FIGS. 4A, 4B, and 4C, vertical extension members 412 and 413 are located at the opposite end of lifter frame members 410 and 411 from lifter frame member 404 and just behind engagement members 416 on lifter frame member 410 and 411. Fixed wheel 414 is located at the bottom (closest to the ground in use) of vertical extension member 412 and fixed wheel 417 is located at the bottom of vertical extension wheel 413. Vertical extension member fixed wheels 414 and 417 are roller wheels which are as wide or nearly as wide as width 230. Vertical extension member fixed wheels 414 and 417 can only move backwards and forwards in one orientation. The width and fixed orientation of fixed wheels 414 and 417 enable more precise engagement of lifter 400 with the engagement openings of the rack by minimizing the amount of side to side movement that occurs when moving the lifter to engage with the rack as well as greater stability of lifter 400. Arrow 415 represents an entry-exit axis of lifter 400 upon which lifter 400 moves to engage with the rack. Fixed wheels 414 and 417 move along this axis. Arrow 415 contrasts with arrows 409 which represent movement in all directions.

Vertical extension members 406, 412, and 413 may be connected to a controller which controls the extension of extension members 406, 412, and 413 and therefore the height of lifter 400. The extension of extension members 406, 412, and 413 is controlled by the hydraulic system. Hydraulic pistons are located inside vertical extension members 406, 412, and 413. Vertical extension members 406, 412, and 413 may include two steel tubes wherein one of the steels tubes is an exterior tube and the other steel tube is an interior tube positioned inside the exterior tube. The outer surface of the interior tube is in contact with the inner surface of the exterior tube. In FIGS. 4A, 4B, and 4C the tubes are rectangular prisms. In other embodiments, the tubes may be made from another material or may be another shape.

In the embodiment of FIGS. 4A, 4B, and 4C, vertical extension members 406, 412, and 413 can extend, under the power of the hydraulic system, to lift lifter 400 a vertical displacement (e.g., six inches) further off the ground than at the lowest setting (where all parts of lifter 400 are as close to the ground as possible). When lifting a rack, lifter 400 has a further position where the lifter is four inches above the lowest setting. In other embodiments the vertical extension members may lift past six inches or less than six inches at the highest point (where all parts of the lifter are as far from the ground as possible) or may lift the rack fewer or more than four inches. Because the glass rack is lifted from the base and the lifted height is minimal this system and method of lifting does not require reinforcement as other conventional systems do.

Engagement members 416, 420, and 424 carry engagement feet 418, 422, and 426, respectively. Engagement feet 418, 422, and 426 are flat metal panels which extend outward from engagement feet 416, 420, and 424 along entry-exit axis 415 and are parallel to lifter frame members

410. The design of engagement feet 418, 422, and 426 is similar to that of the forks of forklifts as this is a standard and time-tested design for engaging with and lifting an object with matching engagements openings. In other embodiments, the design of the engagement feet can be any suitable design which can interlock with matching engagement openings of a rack.

In use, forklift connection member 402 is connected to a forklift, or any other towing device capable of being connected to lifter 400 and towing/pushing the weight of lifter 400. Forklift connection member 402 may connect to the forklift by a ball and hitch connection, wherein the ball may be on forklift connection member 402 and the hitch on the forklift, or the hitch may be on connection member 402 and the ball may be on the forklift. In other embodiments other means of connection between lifter 100 and the forklift may be employed.

Swivel wheels 408 and fixed wheels 414 and 417 allow lifter 400 to move by being towed or pushed by the forklift. The forklift lifts lifter 400 such that the lifter is no longer touching the ground. In this lifted position the connected forklift and lifter are maneuvered by the forklift to position lifter 400 inside an interior space of a loaded or empty glass rack. Only lifter frame members 410, connection frame members 411, attached engagement members 416 and 420, and vertical extension members 412 are positioned within the interior space of the rack. The forklift then lowers lifter 400 within the interior space so that lifter 400 is again touching the ground at wheels 408 and 414.

The forklift then moves lifter 400 so that engagement feet 418, 422, and 426 engage with engagement openings on the rack. Extensions members 406, 412, and 413 extend to lift the glass rack off the ground. The forklift does not lift the glass rack but can then tow and/or push the lifter and glass rack to the desired location.

In this embodiment, lifter 400 may work particularly well with a rack similar to rack 204 from FIG. 2. Rack 204 does not have a beam similar to beam 203 or rack 202 as part of the base. Therefore, the wider fixed wheels 414 and 417 and the fixed wheel of guiding-and-lifting member 434 will not be impeded by such a beam and will provide greater stability and precision for lifter 400.

In the embodiment of FIG. 4, parallel lifter frame members 410 are indirectly connected by connection frame members 411. In other embodiments the parallel lifter frame members may be directly connected together. The direct connection of the parallel lifter frame members creates a thinner frame for the lifter and allows for a smaller AA-frame and interior space of the rack.

For example, looking at rack 300 of FIG. 3, positioning the two beams of each A-frame member 316, 318, and 320 together on the respective base beams 304, 306, and 308 increases the area of base beams 304, 306, and 308 which glass or other materials to be moved can be placed on. That is, where the interior space and distance between AF-frame beams are smaller than rack 300, then the length from the end of the base beam to the connection to the A-frame will be greater than rack 300. This length can then hold more glass (or other materials).

For example, where the rack 300 has a distance between A-frame beams of 30 inches, a length of a base beam of 74 inches, and a width of A-frame beams of 2 inches then the length of base beam on each side of the A-frame beams is 20 inches. Where each package of glass is 4 inches then each side of the rack can only hold 5 packages of glass (20 inches). However, if the distance between A-frame members is 10 inches then the length of base beam on each side of the A-frame beams is 30 inches and each side of the rack can hold 7 packages of glass (28 inches). That is, each rack can hold 14 packages of glass compared to the 10 packages of the example of rack 300.

In other embodiments there may be more or less vertical extension members than on lifter 400. In other embodiments there may be additional wheels or guiding apparatuses that help move or guide the lifter but do not have the lifting functionality of a vertical extension member.

In the embodiment of FIG. 4, guiding-and-lifting member 434 lifts lifter 400 off the ground so lifter 400 can be maneuvered into an interior space of the rack. In other embodiments, a lifting-and-towing machine, such as a forklift, may lift the lifter for this purpose. An embodiment of a lifter without a guiding-and-lifting member is discussed in FIG. 5.

Figure 5A:
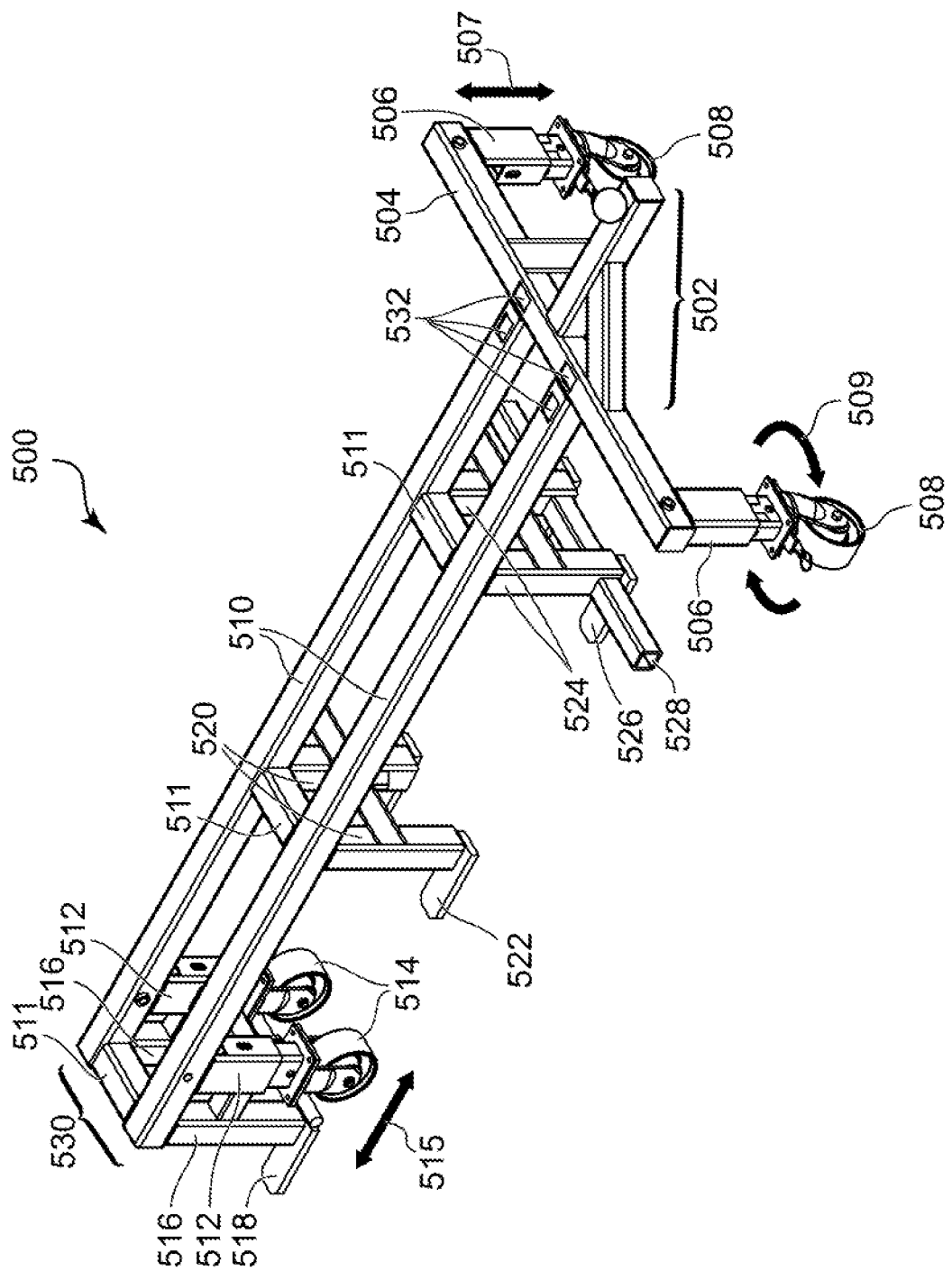
FIGS. 5A to 5D are perspective, side lifted position, side lowered position, and top views, respectively, of a lifter in accordance with an embodiment.
Figure 5B:
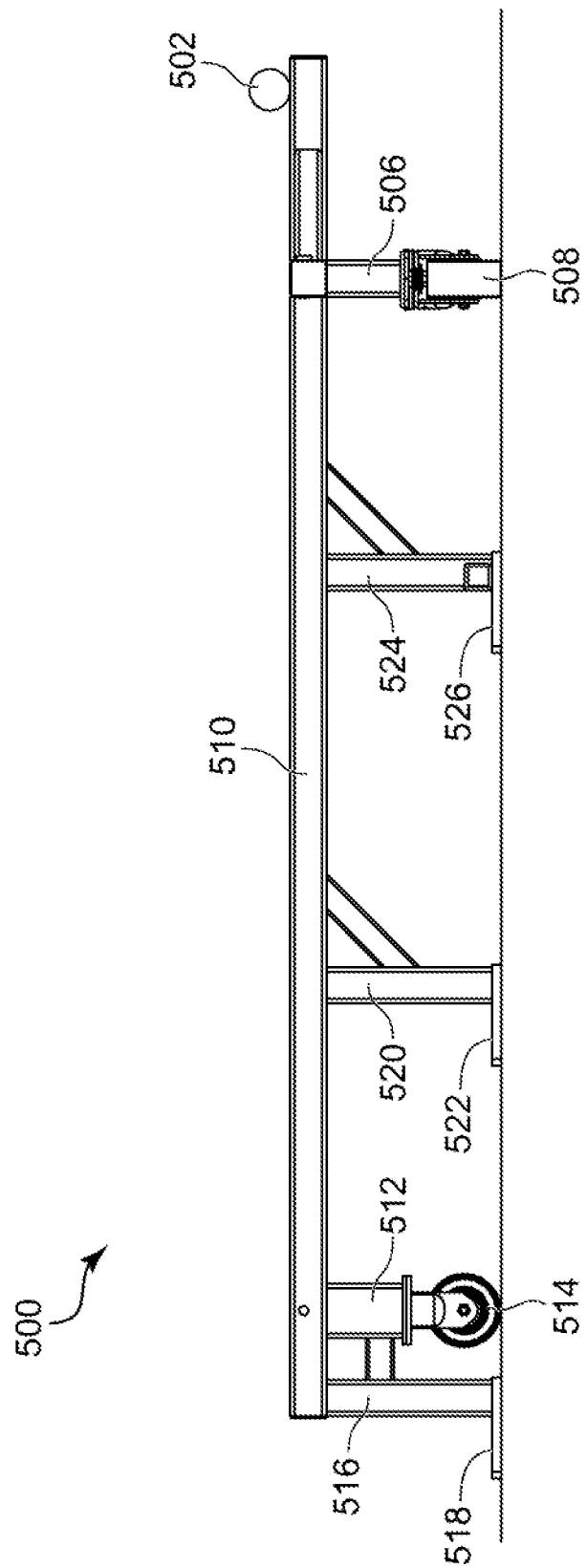
Figure 5C:
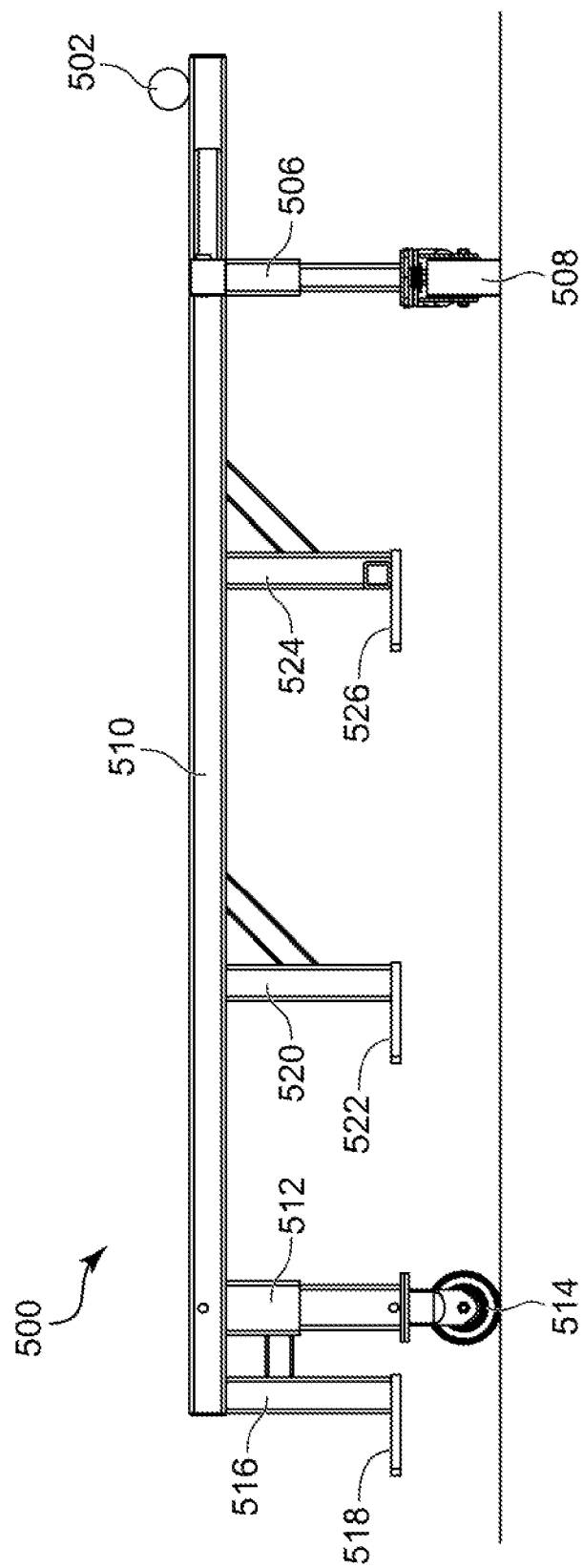
Figure 5D:
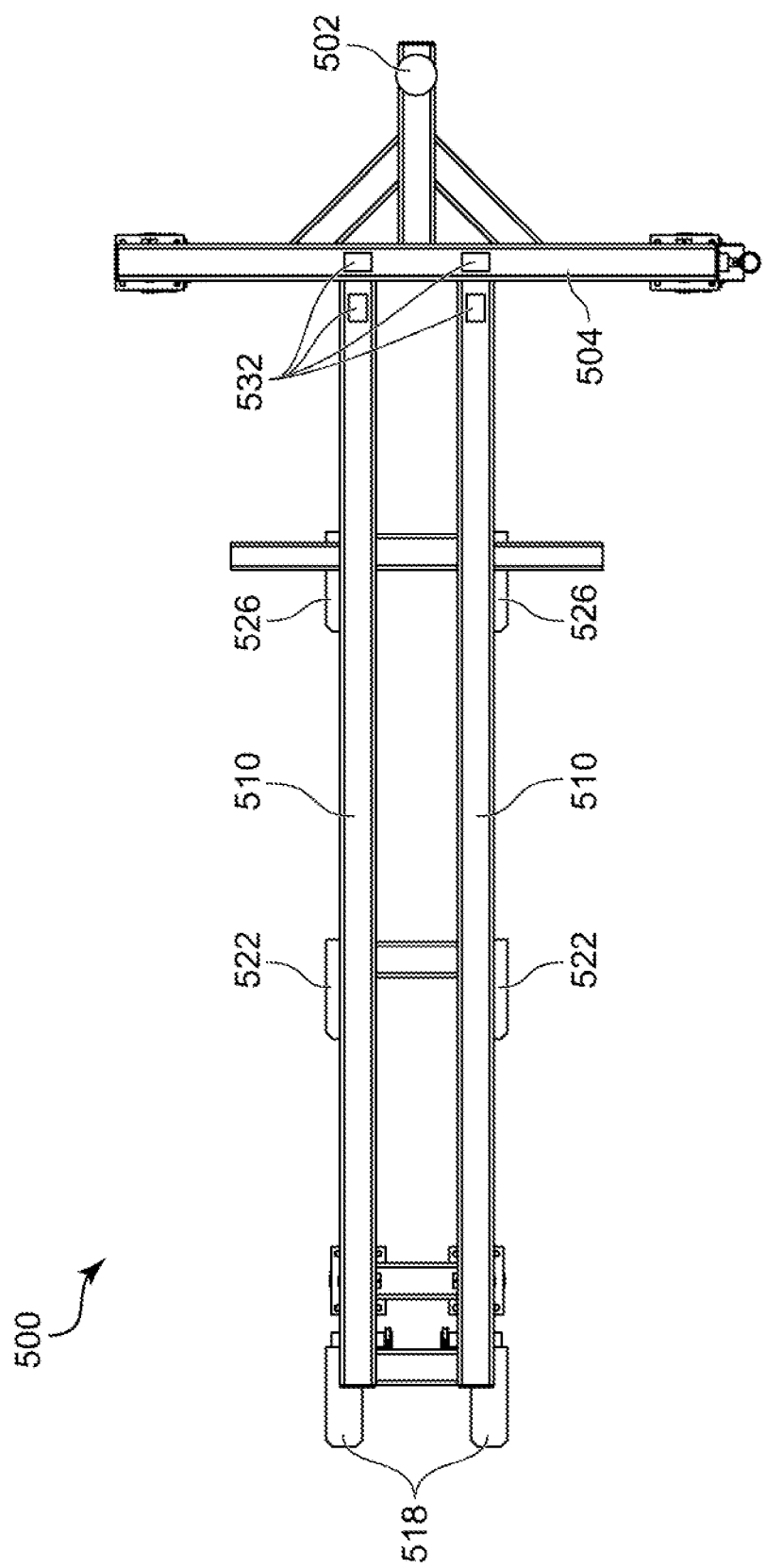

Referring to FIGS. 5A, 5B, 5C, and 5D illustrated therein are several views of a lifter 500 for a glass rack lifting system, according to one embodiment. FIG. 5A is a top and side view of lifter 500 in a lifted position. FIG. 5B is a side view of lifter 500 in a lifted position. FIG. 5C is a side view of a lifter 500 in a lowered position. FIG. 5D is a top view of lifter 500.

Lifter 500 includes forklift connection member 502, lifter frame member 504, vertical extension members 506, vertical extension member swivel wheels 508, two parallel lifter frame members 510, connection frame members 511, vertical extension members 512, vertical extension member fixed wheels 514, engagement members 516 having two engagement feet 518 (one foot is obscured in drawing), engagement members 520 having two engagement feet 522 (one foot is obscured in drawing), engagement members 524 having two engagement feet 526 (one foot is obscured in drawing), and lifter stabilizing member 528. Frame members 504 and 510 includes holes 532 for a hydraulic system (not shown). Vertical extension members 506 and 512, and engagement members 516, 520, and 524 are all directly or indirectly connected to and supported by lifter frame members 504, 510, and 511. The functional specifics of lifter 500 are discussed below.

Lifter frame members 510 are two parallel beams which are connected by three connection frame members 511. Connection frame members 511 are perpendicular to lifter frame members 510. Connection frame members 511 are positioned at the same locations as engagement members 516, 520, and 524 along a length of lifter frame members 510. Connection frame members 511 provide support to lifter frame members 510 and to engagement members 516, 520, and 524.

Lifter frame member 504 is a single beam which is perpendicular to and attached to lifter frame members 510, and is parallel to connection frame members 511. Lifter frame member 504 extends beyond a width 530 of lifter frame members 510. The length of lifter frame member 504 is greater than width 530 and vertical extension members 506 are located at opposite ends of lifter frame member 504. This allows for stabilization of lifter 100, as well as increased mobility and better weight distribution when lifting a rack.

Lifter frames member 504 and 510 are hollow, wherein each member has an interior space, and are rectangular prism shaped beams wherein the flat surfaces of the beam are parallel and perpendicular to the plane of the ground (if the ground were perfectly level and flat). Lifter frame members 504 and 510 carry the hydraulic systems within the interior spaces. Lifter frame members 504 and 510 are connected to vertical extension members 506 and 512 such that the hydraulic system runs from the interior spaces of lifter frame members 504 and 510 into an interior of vertical extension members 506 and 512. Holes 532 in lifter frame members 504 and 510 are entry and exit points through which the hydraulic system is embedded within lifter 500.

In FIGS. 5A, 5B, 5C and 5D, vertical extension members 506 are located at opposite ends of lifter frame member 504. Vertical extension member swivel wheels 508 have swivel casters which allow the wheels to swivel 360° and allow lifter 500 to move in any direction. This freedom of movement is represented by arrows 509.

In FIGS. 5A, 5B, 5C and 5D, vertical extension members 512 are located at the opposite end of lifter frame members 510 and 511 from lifter frame member 504 and just behind engagement members 516 on lifter frame member 510 and 511. Vertical extension member fixed wheels 514 can only move backwards and forwards in one orientation and therefore enable more precise engagement of lifter 500 with the engagement openings of the rack by minimizing the amount of side to side movement that occurs when moving the lifter to engage with the rack. Arrow 515 represents an entry-exit axis of lifter 500 upon which lifter 500 moves to engage with the rack. Wheels 514 move along this axis. Arrow 515 contrasts with arrows 509 which represent movement in all directions.

Vertical extension members 506 and 512 may be connected to a controller (not pictured) which controls the extension of extension members 506 and 512 and therefore the height of lifter 500. The extension of extension members 506 and 512 is controlled by the hydraulic system wherein hydraulic pistons are located inside vertical extension members 506 and 512. Vertical extension members 506 and 512 may comprise two steel tubes wherein one of the steels tubes is an exterior tube and the other steel tube is an interior tube positioned inside the exterior tube, and wherein the outer surface of the interior tube is in contact with the inner surface of the exterior tube. In FIGS. 5A, 5B, and 5C the tubes are rectangular prisms. In other embodiments the tubes may be made from another material or may be another shape.

In FIG. 5B vertical extension members 506 and 512 are in a lowered or shortened position wherein the top of lifter 500 is as close to the ground as possible. In FIG. 5C vertical extension members 506 and 512 are in a raised or extended position wherein the top of lifter 500 is as far from the ground as possible. Arrow 507 is a raising-lowering vertical axis which represents the direction which lifter 500 moves when vertical extension members 506 and 512 are extended or shortened.

In the embodiment of FIGS. 5A, 5B, 5C and 5D, the vertical extension members can extend, under the power of the hydraulic system, to lift lifter 500 six inches further off the ground than at the lowest setting (where all parts of lifter 500 are as close to the ground as possible). When lifting a rack, lifter 500 has a different setting where the lifter is four inches above the lowest setting. In other embodiments the vertical extension members may lift past six inches or less than six inches at the highest point (where all parts of the lifter are as far from the ground as possible) or may lift the rack fewer or more than four inches. Because the glass rack is lifted from the base and the lifted height is minimal this system and method of lifting does not require reinforcement as other conventional systems do.

In use, forklift connection member 502 is connected to a forklift, or any other towing device capable of being connected to lifter 500 and towing/pushing the weight of lifter 500. Forklift connection member 502 may connect to the forklift by a ball and hitch connection, wherein the ball may be on forklift connection member 502 and the hitch on the forklift, or the hitch may be on connection member 502 and the ball may be on the forklift. In other embodiments other means of connection between lifter 100 and the forklift may be employed.

Swivel wheels 508 and fixed wheels 514 allow lifter 500 to move by being towed or pushed by the forklift. The forklift lifts lifter 500 such that the lifter is no longer touching the ground. In this lifted position the connected forklift and lifter are maneuvered by the forklift to position lifter 500 inside an interior space of a loaded or empty glass rack. Only lifter frame members 510, connection frame members 511, attached engagement members 516 and 520, and vertical extension members 512 are positioned within the interior space of the rack. The forklift then lowers lifter 500 within the interior space so that lifter 500 is again touching the ground at wheels 508 and 514.

The forklift then moves lifter 500 so that engagement feet 518, 522, and 526 engage with engagement openings on the rack. Extensions members 506 and 512 extend to lift the glass rack off the ground. The forklift does not lift the glass rack but can then tow and/or push the lifter and glass rack to the desired location.

Lifter stabilizing member 528 is a beam connected to engagement members 524 and positioned perpendicular to frame members 510. Lifter stabilizing member 528 acts to provide further support and to stabilize lifter 500 and the glass rack when they are engaged and lifted.

In this embodiment, lifter 500 may work particularly well with a rack similar to rack 202 from FIG. 2. Rack 202 has beam 203 as a member of the base. The separation between fixed wheels 514 allows for lifter 500 to fit over beam 203 when lifter 500 is lowered within an interior space of rack 202.

Lifters 400 and 500 are examples of possible lifter embodiments. In other embodiments, there may be more or less engagement members, engagement feet, vertical extension members, frame members, wheels, or stabilizing members. In other embodiments the location of engagement members, vertical extension members, guiding-and-lifting members, and stabilizing members, may be altered to improve the stability and weight distribution of the lifter. The number and locations of the above mentioned members may take into consideration the design of the rack which is to be lifted and moved.

Figure 6:
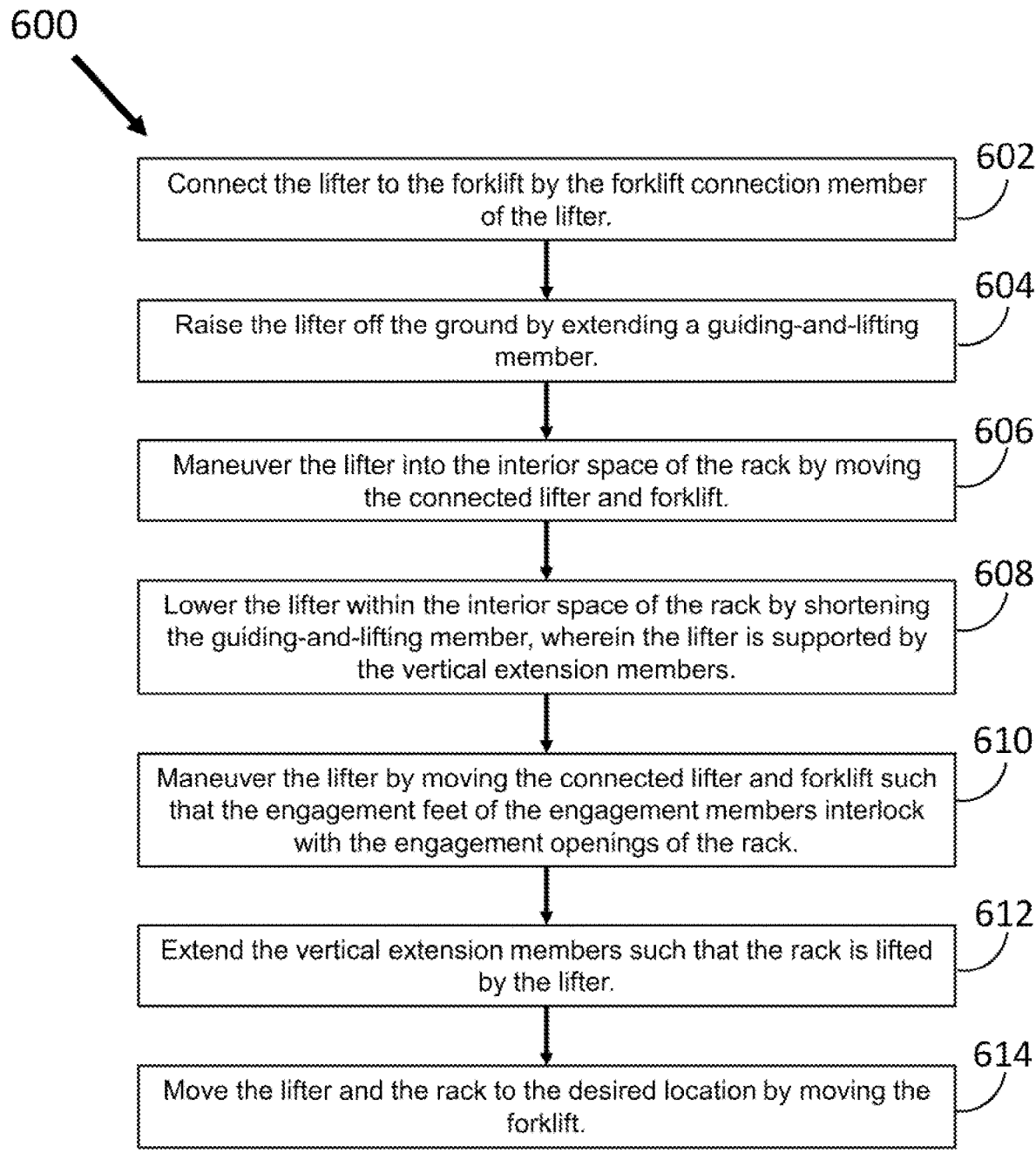
FIG. 6 is a flow diagram of a method of moving a rack using a rack lifting system, according to an embodiment.

FIG. 6 is a flow diagram of a method 600 of using a glass rack lifting system to move a glass rack, according to one embodiment. The method described employs a system comprising a rack with an interior space and at least a first set of engagements openings, a lifter with a forklift connection member, at least a first set of engagement members with engagement feet, at least a first set of vertical extension members with attached wheels, and a guiding-and-lifting member, and a forklift.

At 602 the lifter is connected to the forklift by the forklift connection member. The forklift connection member and forklift may be connected by a ball and hitch connection where the ball may be on the forklift connection member and the hitch on the forklift, or the hitch may be on the forklift connection member and the ball on the forklift. In other embodiments, other suitable types of connection between the lifter and the forklift may be employed.

At 604, the lifter is raised off the ground by extending the guiding-and-lifting member. Extending the guiding-and-lifting member may include un-folding the guiding-and-lifting member when the guiding-and-lifting member is similar to guiding-and-lifting member 434 of FIG. 4. Extending the guiding and lifting member may be accomplished by a hydraulic system within the guiding-and-lifting member and by a controller which controls the hydraulic system. When the guiding-and-lifting member is extended the lifter is lifted off the ground such that the components of the lifter which need to move into an interior space of the rack are high enough to clear all components of the rack. The vertical extension members which support the lifter when it is lowered may or may not remain in contact with the ground depending on their location on the lifter. That is, any vertical extension members which need to move into the interior space will be raised off the ground, while any vertical extension member which always remain outside of the interior of the rack may remain in contact with the ground.

At 606, the lifter is maneuvered into the interior space of the rack by moving the connected lifter and forklift. This movement is accomplished by the forklift and may comprise both towing and pushing.

At 608, the lifter is lowered back to the ground within the interior space of the rack by shortening the guiding-and-lifting member. In some embodiments the guiding-and-lifting member may shorten and then fold up out of the way as in FIG. 4. Upon lowering, the vertical extension members, more specifically the wheels of the vertical extension members, are in contact with the ground.

At 610, the engagement members of the lifter interlock with the engagement openings of the rack by moving the lifter into an interlocking position by the forklift. In some embodiment, guides on the rack, on the lifter, or on both may help with maneuvering the lifter into the correct position within the engagement openings.

At 612, the vertical extension members of the lifter extend such that the rack is lifted off the ground by the lifter. The rack is lifted only by the lifter and the forklift does not bear any of the weight of the rack.

At 614, the rack and lifter are moved to a desired location by towing and/or pushing by moving the forklift.

In some circumstances the desired location may be a shipping container and the rack and lifter can be pushed right into the shipping container by the forklift. Currently, when loading shipping containers, loaded glass racks are moved into a shipping container from above or the side by an overhead crane. The systems described herein eliminate the need for expensive equipment such as overhead cranes, decrease the amount of time spent moving the glass, decrease risks for both the product and workers, and may be operated using some of the equipment, such as a forklift, that is already common within a glass factory or warehouse.

Figure 7:
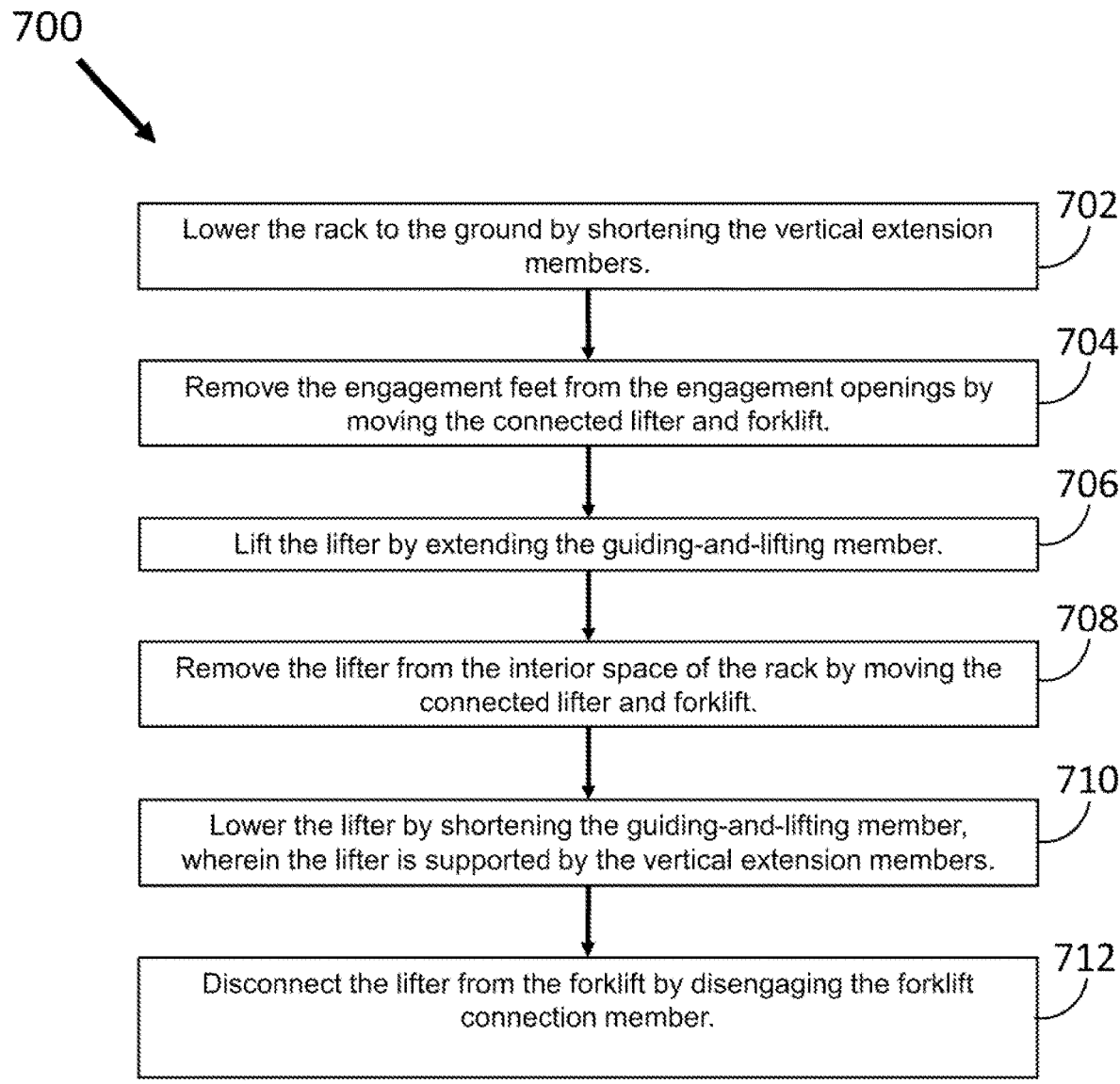
FIG. 7 is a flow diagram of a method of removing a lifter from a rack using a rack lifting system, according to an embodiment.

FIG. 7 is a flow diagram of a method 700 of removing a glass rack from a glass rack lifting system, according to one embodiment. The method described employs a system comprising a rack with an interior space and at least a first set of engagements openings, a lifter with a forklift connection member, at least a first set of engagement members with engagement feet, at least a first set of vertical extension members with attached wheels, and a forklift.

The lifting system is identical to the lifting system of method 600, and method 700 describes the process of removing the lifter from the glass rack once the glass rack has been moved to the desired location at step 614 of method 600. Therefore, at step 702, the glass rack and lifter are interlocked at the engagement members and engagement openings and the vertical extension members of the lifter are extended such that the rack is lifted off the ground. The interlocked rack and lifter are connected to the forklift by the forklift connection member of the lifter.

At 702, the rack is lowered to the ground by shortening the vertical extension members.

At 704, the lifter is disengaged from the rack by removing the engagement feet from the engagement openings by moving the connected lifter and forklift.

At 706, the lifter is raised off the ground by extending the guiding-and-lifting member.

At 708, the lifter is removed from the interior space of the rack by moving the connected lifter and forklift.

At 710, the lifter is lowered to the ground by the guiding-and-lifting member. That is the hydraulic system of the guiding-and-lifting member may shorten the guiding-and-lifting member. The guiding-and-lifting member may fold up upon shortening similar to guiding-and-lifting member 434 of FIG. 4.

At 712, the lifter is disconnected from the forklift by disengaging the forklift connection member.

Referring to FIGS. 8A, 8B, 8C, and 8D, illustrated therein are several views of a lifter 800 for a glass rack lifting system, according to one embodiment.

Figure 8A:
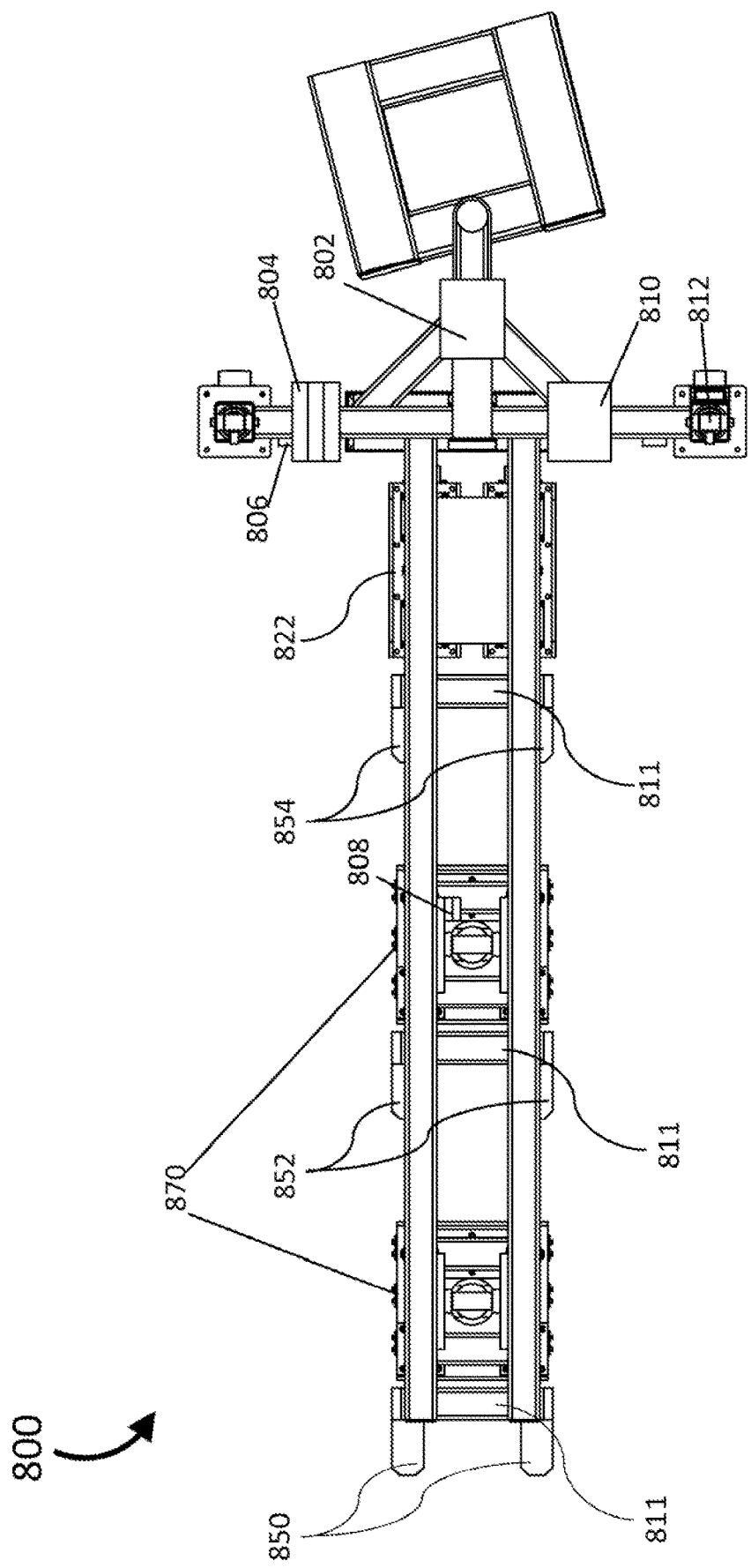
FIGS. 8A to 8D are top, side, side lowered position, and side lifted position views, respectively, of a lifter in accordance with an embodiment.

Referring in particular to FIG. 8A, lifter 800 includes directional valve 804 for raising and lowering the lifter. Lifter 800 further includes fluid control valves 806 and 808 for empowering the hydraulic components of lifter 800 through controlling the flow of liquid. The lifter 800 further includes control element 810 for controlling the lifter 800. The lifter 800 further includes hydraulic controls reservoir 802 for controlling the hydraulics. The lifter 800 further includes stabilizer lifter 812, which may advantageously promote balance and stability of glassware loaded onto the lifter in order to avoid breakage during lifting and lowering.

Lifter 800 further includes connection frame members 811.

Figure 8B:
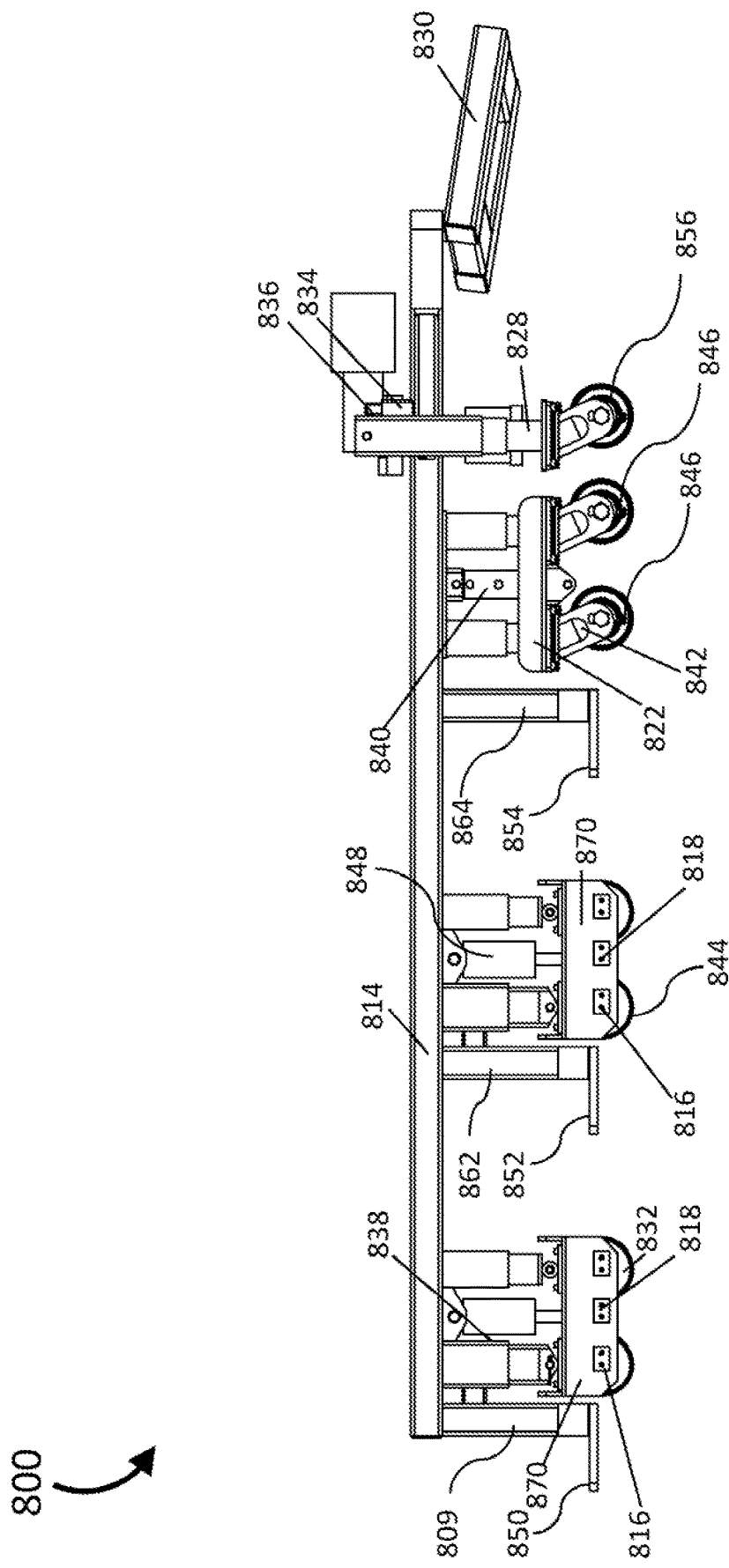

Referring now to FIG. 8B, fixed wheels 832 and 844 for movement are adjacent to pivot chassis retainer 816 and axle shaft 818, both of which hold the fixed wheel apparatus together. Surrounding fixed wheels 832 and 844 from above are fixed wheel chassis 870. Lifter 800 further includes fixed wheel lift 838, which assists in the lifting and lowering of the entire lifter 800. Further above these elements is main weldment 814, which may increase the load-bearing capacity of lifter 800 by distributing force evenly throughout the vertical members thereunder.

The lifter 800 includes a swivel wheel chassis 822 connected to the swivel wheels and swivel casters 842 for protecting and facilitating efficient repositioning of those swivel wheels 846 and 56. Further above is swivel carriage lifter 840, which along with fixed wheel lifts 838 and 848 lifts and lowers the device. Both swivel carriage lifter 840 and fixed wheel lifts 838 and 848 are seen in operation in FIGS. 8C and 8D. Each of the wheels 832, 844, 846, and 856 articulates independently.

Figure 8C:
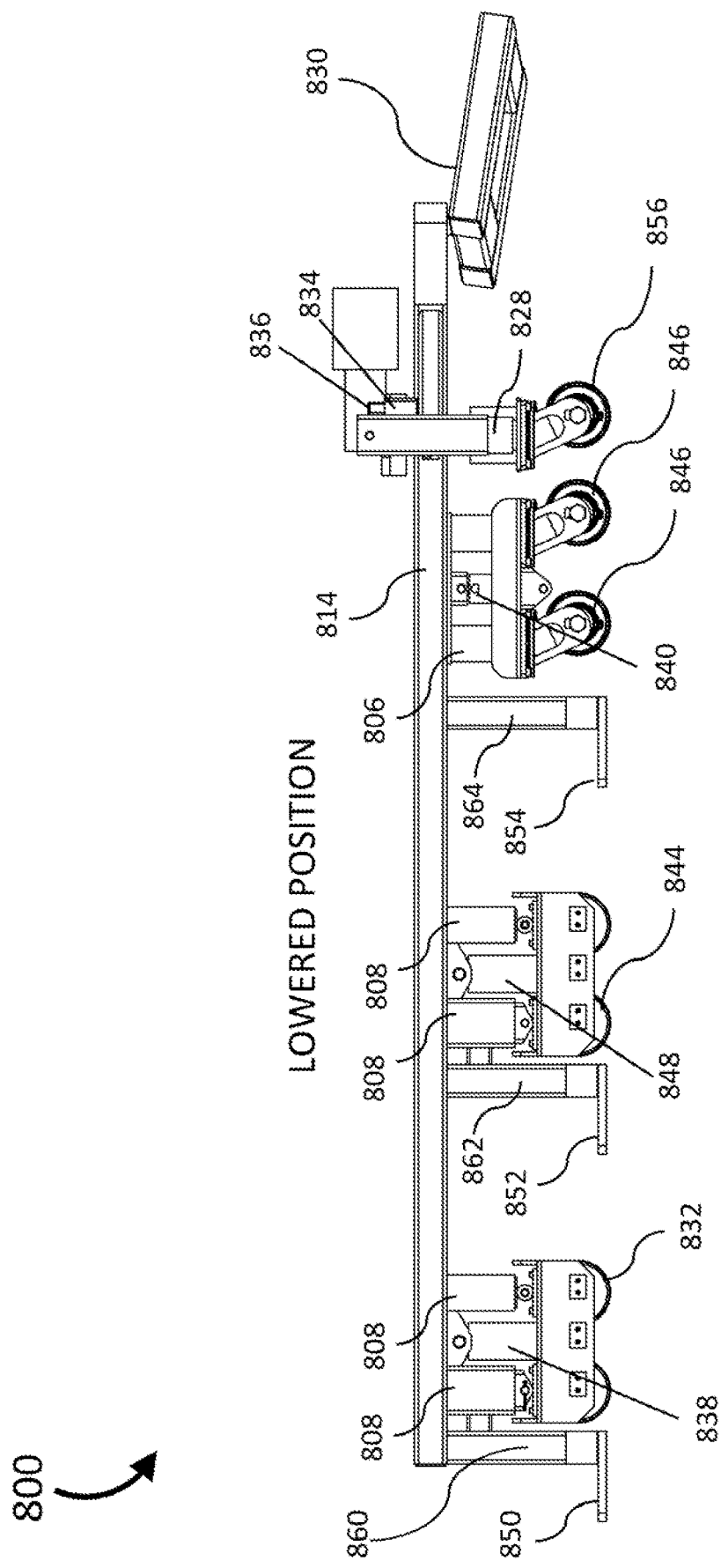
Figure 8D:
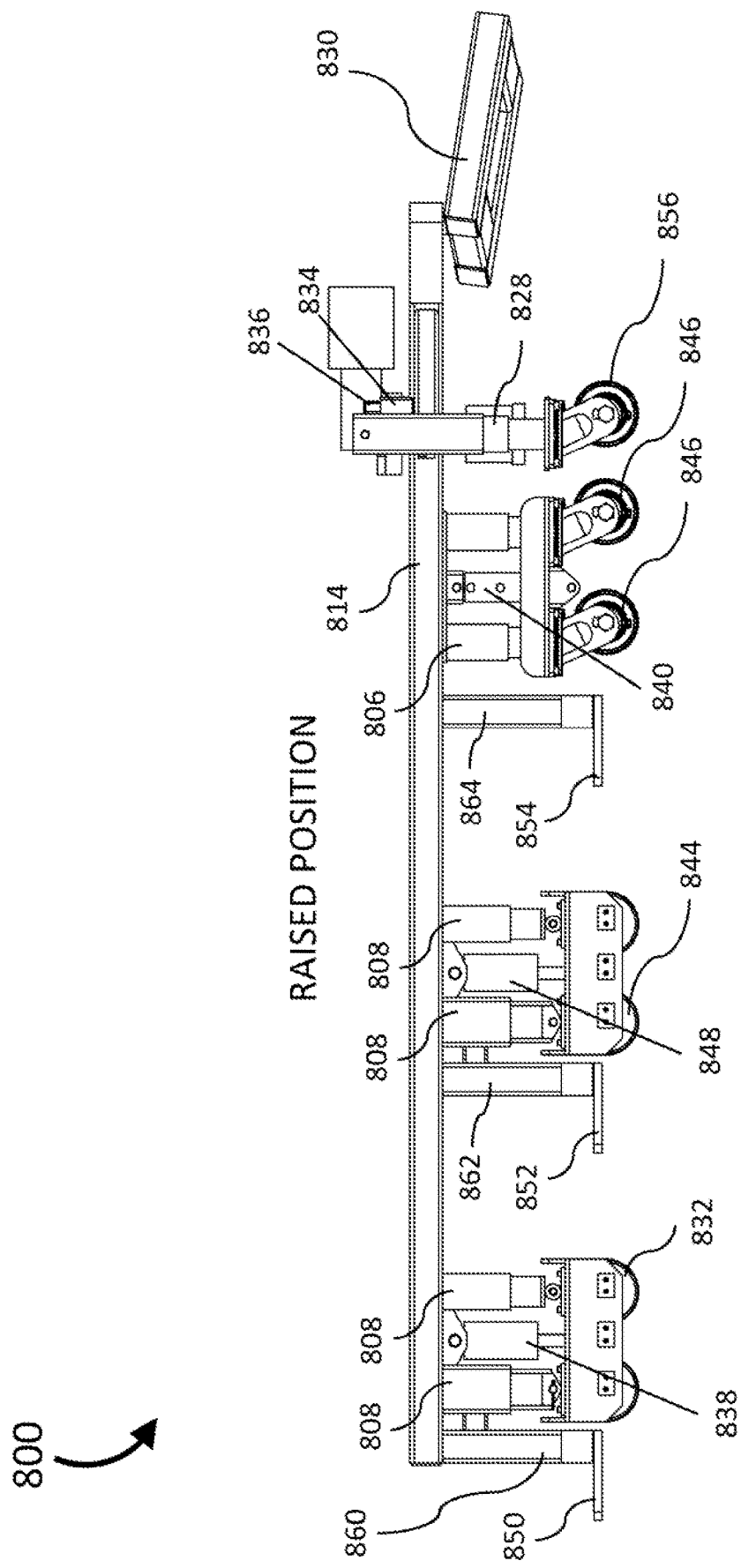
Figure 9A:
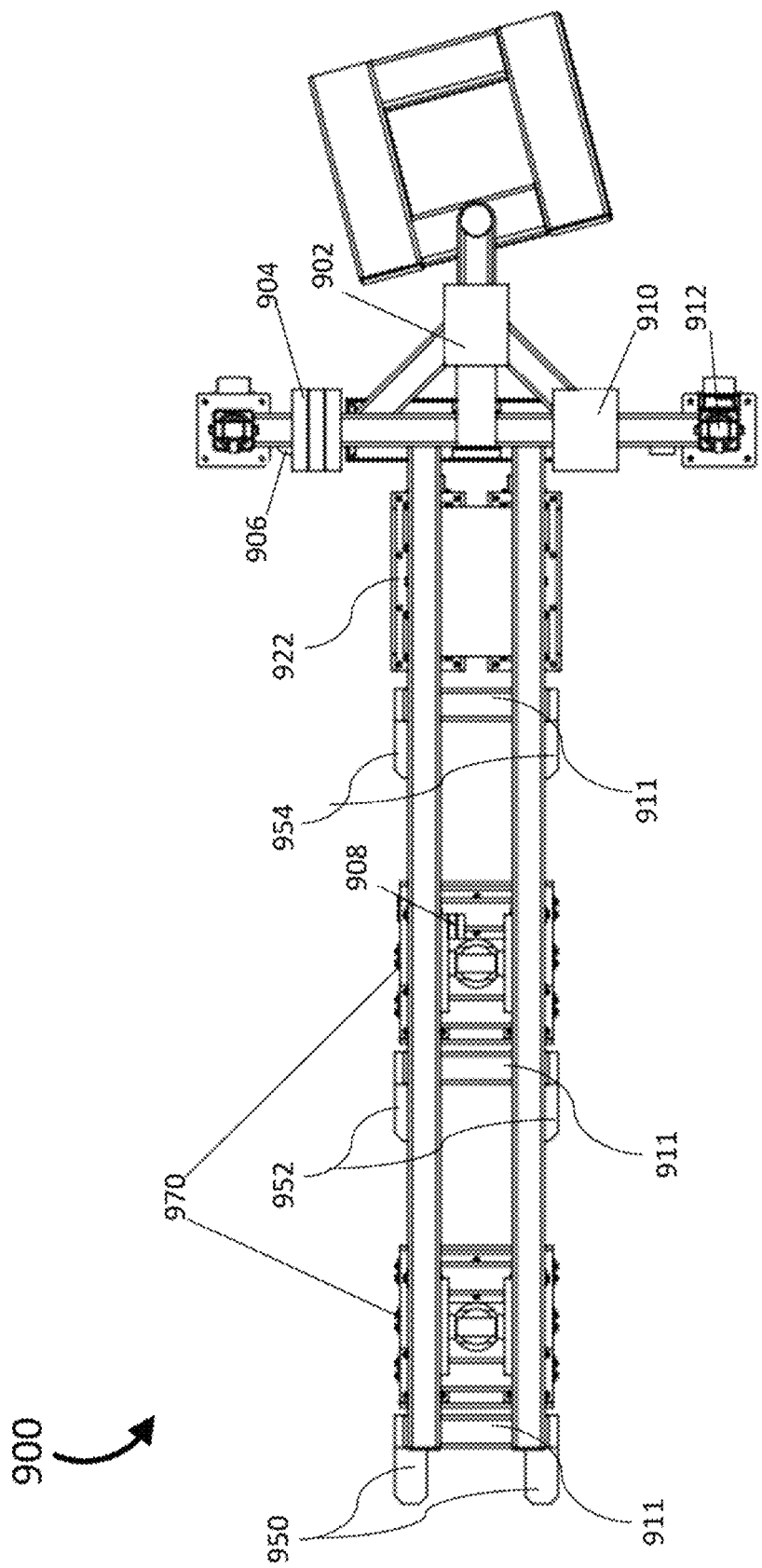
Figure 9B:
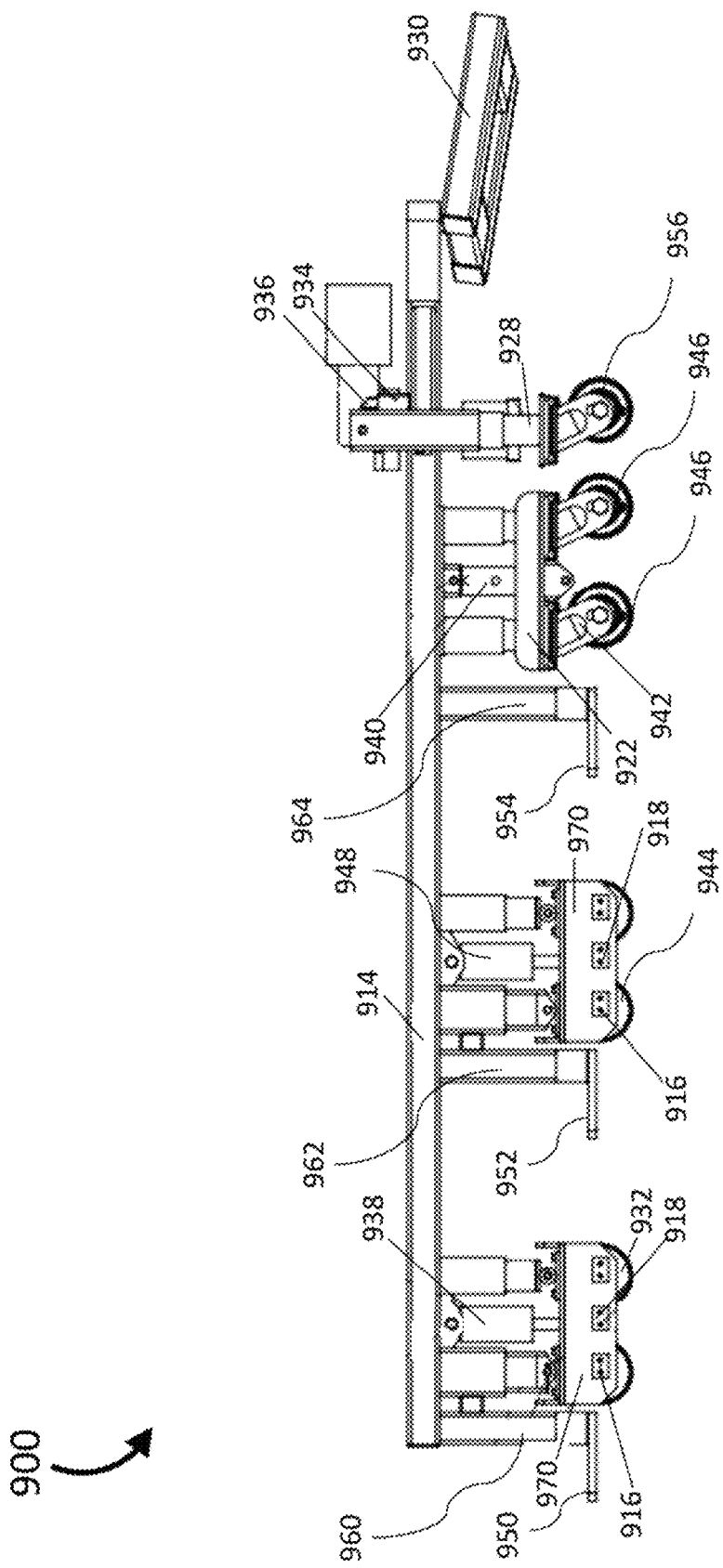
Figure 9C:
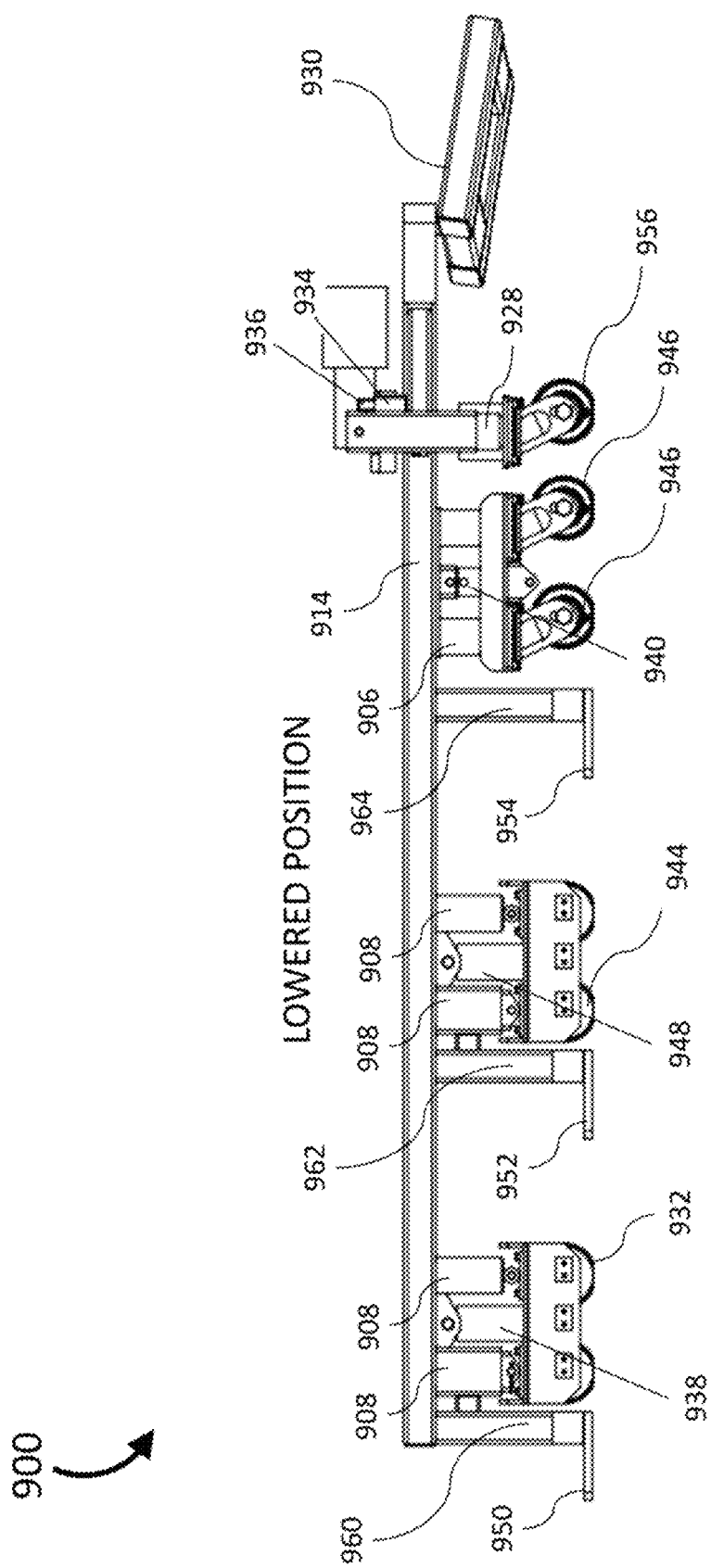
Figure 9D:
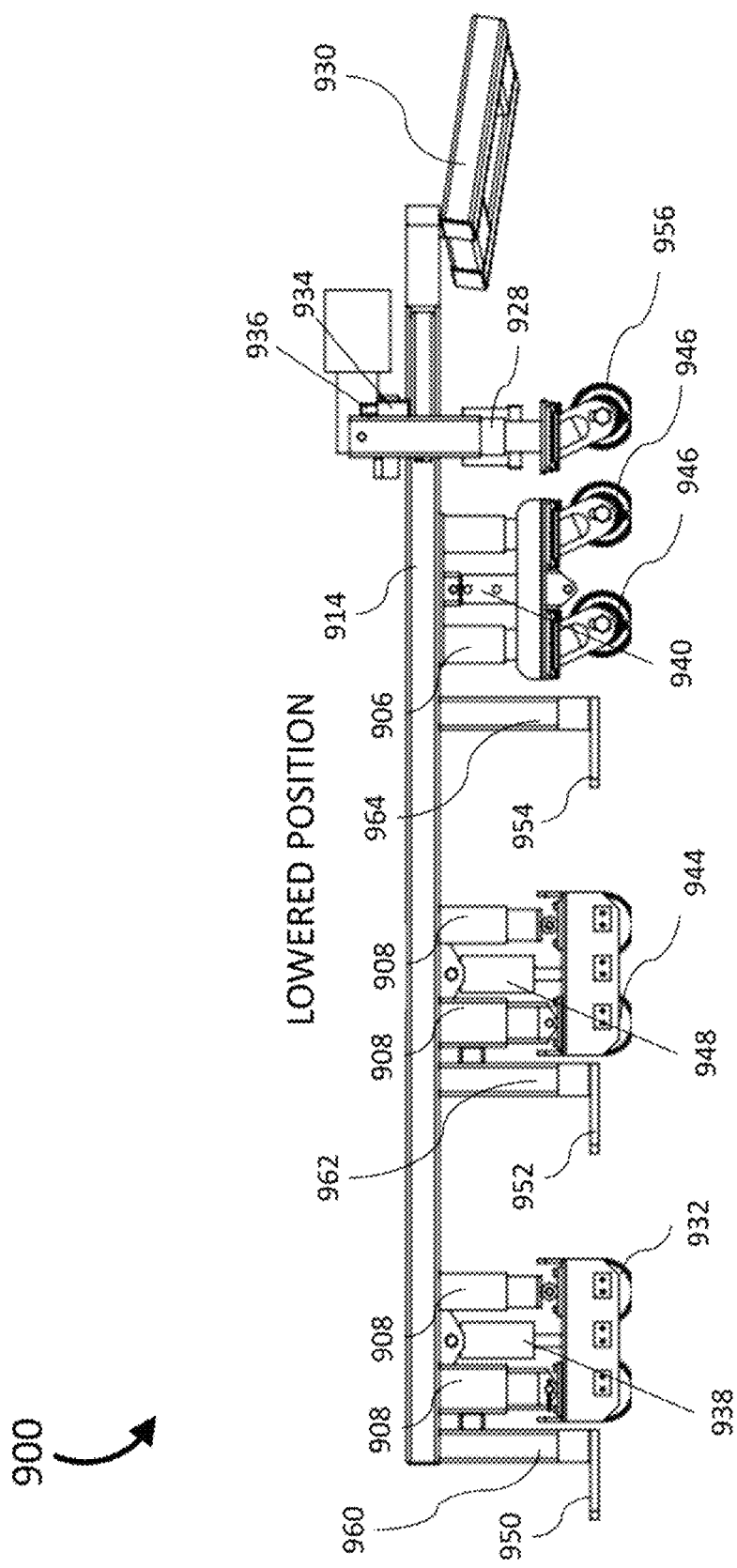

Referring now to FIGS. 8C and 8D, the lifter 800 further includes vertical extension members 806 above swivel wheels 846. The lifter 800 further includes vertical extension members 808 above fixed wheels 832 and 844.

The lifter 800 includes stabilizer wheel mount 828 for stabilizing the frontmost swivel wheel while the other wheels 832, 844, and 846 are lifted or lowered.

The lifter 800 includes engagement members 860 having two engagement feet 850 (one foot is obscured in FIGS. 8B through 8D), engagement members 862 having two engagement feet 852 (one foot is obscured in FIGS. 8B through 8D), engagement members 864 having two engagement feet 854 (one foot is obscured in FIG. 8B through 8D)

The lifter 800 further includes wireless human-machine interface 836 for effective communication of instructions to the lifter 800. The lifter 800 further includes human-machine interface storage 834 for storage of wireless human-machine interface 836. Such efficient communication may advantageously result in smoother operation of lifter 800, reducing breakage and injuries caused as a result of breakage during the transport of glass.

The lifter 800 includes fork lift hitch 830 for connecting to a towing device such as a fork lift.

The lifter and lifting system described above provide many advantages and benefits over current lifting systems in the glass hauling industry. The lifting system can be used for multiple types of freight transportation as the system can move the racks to any transportation storage equipment which is accessible by a forklift. The lifting system is more affordable and more functional than lifters in current systems and does not need to be dedicated to moving glass racks solely for transportation. For example, within a glass warehouse the lifting system may be used to move glass around to different stations similar to an assembly line. Additionally, the lifter can perform all steps of moving glass for transport instead of requiring multiple different pieces of equipment to move the glass.

The lifter has several points of contact with the rack and therefore the weight of the rack is distributed across the lifter more evenly than with current conventional lifters which may only have a few points of contact with the rack. This allows the lifter to lift more weight than current models, making moving racks more efficient and less time consuming.

While the above description provides examples of one or more apparatuses, methods, or systems, it will be appreciated that other apparatuses, methods, or systems may be within the scope of the claims as interpreted by one of skill in the art.

The invention claimed is:

1. A rack transportation system comprising:
    a rack for holding a material, the rack comprising:
        a base comprising a plurality of base beams and a plurality of connection beams, the base having a plurality of lifter engagement openings disposed in saki plurality of base beams;
        a plurality of a-frame members comprising a-frame beams, wherein each a-frame member is connected to a respective base beam; and
        an interior space created by the plurality of base beams, the plurality of connection beams, and the plurality of a-frame members;
    a lifter for lifting the rack, the lifter comprising:
    a plurality of frame beams;
    a plurality of engagement members connected to the frame beams, each engagement member including at least one engagement foot, wherein in use each engagement foot contacts an engagement opening of the plurality of base beams of the rack, and
    at least a first vertically extendable beam connected to the frame beams, wherein in use the at least a first vertically extendable beam extends to lift the lifter plurality of frame beams and the plurality of engagement members relative to the ground and contracts to lower the plurality of frame beams and the plurality of engagement members relative to the ground, and wherein the at least a first vertically extendable beam includes at least a first movement member to enable movement of the lifter into and out of the interior space above the plurality of base beams.

2. The system of claim 1, wherein the lifter is connectable to a towing machine.

3. The system of claim 1, wherein the at least a first movement member of the first vertically extendable beam comprises at least one swivel wheel.

4. The system of claim 1, wherein at least a first movement member of a second vertically extendable beam comprises at least one fixed wheel.

5. The system of claim 1, wherein the lifter further comprises a guiding-and-lifting member, wherein in use the guiding-and-lifting member guides the movement of the lifter and lifts the lifter.

6. The system of claim 5, wherein the guiding-and-lifting member comprises at least one fixed wheel.

7. The system of claim 1, wherein the lifter further comprises at least one swivel carriage lifter and at least one fixed wheel lift.

8. The system of claim 1, wherein the lifter further comprises a stabilizing member for balance.

9. The system of claim 1, wherein the lifter further comprises hydraulics used for lifting and lowering.

10. The system of claim 9, wherein the lifter further comprises a wireless human-machine interface and storage therefor.

11. The system of claim 1 wherein:
    the at least one vertically extendable beam lifts the lifter from a lowered position to a raised position in which the at least one movement member can maneuver the lifter into the interior space of the rack; and
    wherein, when the lifter is within the interior space, the at least one vertically extendable beam lowers the lifter into the lowered position in which the at least one movement member can maneuver the engagement feet to contact the engagement openings; and
    wherein, when the engagement feet are in contact with the engagement openings, the at least one vertically extendable beam lifts the lifter and the rack from the lowered position to the raised position.

12. A rack lifter comprising:
    a frame including a plurality of frame beams;
    a plurality of engagement members connected to the plurality of frame beams, each engagement member including at least one engagement foot; and
    at least a first vertically extendable beam connected to the plurality of frame beams, wherein in use the engagement feet contact a plurality of engagement openings disposed in a plurality of base beams of a rack, wherein the at least a first vertically extendable beam extends to lift the lifter and rack and contract to lower the rack, and wherein the at least a first vertically extendable beam includes at least a first movement member to move the lifter above the plurality of base beams, and into and out of an interior space above the plurality of base beams.

13. The lifter of claim 12, wherein the at least a first movement member of the first vertically extendable beam comprises at least one swivel wheel.

14. The lifter of claim 12, wherein at least a first movement member of a second vertically extendable beam comprises at least one fixed wheel.

15. The lifter of claim 12, wherein the lifter further comprises a guiding-and-lifting member, wherein in use the guiding-and-lifting member guides the movement of the lifter and lifts the lifter.

16. The lifter of claim 12, wherein the lifter further comprises at least one swivel carriage lifter and at least one fixed wheel lift.

17. The lifter of claim 12, wherein the lifter further comprises a hydraulic system for extending the at least one vertically extendable beam.

18. The lifter of claim 12, wherein the lifter further comprises a stabilizing member for balance, wherein the stabilizing member is connected to the frame.

19. The lifter of claim 18, wherein the lifter further comprises a wireless human-machine interface and storage therefor.

20. A method of lifting a rack using a lifter, wherein the rack comprises an interior space disposed between a plurality of base beams of the rack, a plurality of connection beams of the rack, and a plurality of a-frame members of the rack, and a plurality of engagement openings disposed in the plurality of base beams of the rack, and wherein the lifter comprises a towing machine connection member, a guiding-and-lifting member, a plurality of engagement members with at least one engagement foot, and at least one vertically extendable beam, the method comprising:

connecting the lifter to a towing machine by the towing machine connection member of the lifter;

raising the lifter from a lowered position to a lifted position above the plurality of base beams of the rack by the guiding-and-lifting member of the lifter;

maneuvering the lifter into the interior space of the rack between the plurality of base beams, the plurality of connection beams, and the plurality of a-frame members by moving the connected lifter and towing machine;

lowering the lifter within the interior space of the rack by lowering the guiding-and-lifting member of the lifter;

maneuvering the lifter by moving the connected lifter and towing machine such that the engagement feet of the engagement members interlock with the engagement openings of the rack; and extending the at least one vertically extendable beam to lift the rack by the lifter.

21. The method of claim 20 further comprising:

moving the lifter and the rack by moving the towing machine;

lowering the rack to the ground by shortening the vertically extendable beams;

removing the engagement feet from the engagement openings by moving the connected lifter and towing machine;

lifting the lifter by raising the guiding-and-lifting member;

removing the lifter from the interior space of the rack by moving the connected lifter and towing machine;

lowering the lifter by lowering the guiding-and-lifting member, wherein the lifter is supported by the at least one vertically extendable beam; and disconnecting the lifter from the lifting-and-towing machine by disengaging the lifting-and-towing machine connection member.

* * * * *